United States Patent
Dhua et al.

(10) Patent No.: US 10,409,856 B2
(45) Date of Patent: Sep. 10, 2019

(54) APPROACHES FOR ASSOCIATING TERMS WITH IMAGE REGIONS

(71) Applicant: A9.com, Inc., Palo Alto, CA (US)

(72) Inventors: Arnab Sanat Kumar Dhua, Mountain View, CA (US); Himanshu Arora, Palo Alto, CA (US); Sunil Ramesh, San Jose, CA (US)

(73) Assignee: A9.com, Inc., Palo Alto, CA (US)

( * ) Notice: Subject to any disclaimer, the term of this patent is extended or adjusted under 35 U.S.C. 154(b) by 43 days.

(21) Appl. No.: 15/606,812

(22) Filed: May 26, 2017

(65) Prior Publication Data

US 2017/0262475 A1    Sep. 14, 2017

Related U.S. Application Data

(63) Continuation of application No. 14/572,532, filed on Dec. 16, 2014, now Pat. No. 9,697,234.

(51) Int. Cl.
| | |
|---|---|
| *G06K 9/46* | (2006.01) |
| *G06K 9/62* | (2006.01) |
| *G06F 16/00* | (2019.01) |
| *G06F 16/583* | (2019.01) |
| *G06N 7/00* | (2006.01) |

(Continued)

(52) U.S. Cl.
CPC ......... *G06F 16/5846* (2019.01); *G06F 16/00* (2019.01); *G06K 9/325* (2013.01); *G06K 9/4604* (2013.01); *G06K 9/6212* (2013.01); *G06N 7/005* (2013.01); *G06T 11/60* (2013.01)

(58) Field of Classification Search
CPC ............... G06F 17/30253; G06F 17/30; G06F 16/5846; G06F 16/00; G06K 9/4604; G06K 9/325; G06K 9/6212; G06T 11/60; G06N 7/00; G06N 7/005
See application file for complete search history.

(56) References Cited

U.S. PATENT DOCUMENTS

| | | | |
|---|---|---|---|
| 9,697,234 B1* | 7/2017 | Dhua | G06F 17/30253 |
| 2009/0169115 A1* | 7/2009 | Hu | G06K 9/00 |
| | | | 382/209 |

(Continued)

OTHER PUBLICATIONS

USPTO, Non-Final Rejection issued in U.S. Appl. No. 14/572,532 dated Jul. 6, 2016, 9 pages.

(Continued)

*Primary Examiner* — Jon Chang
(74) *Attorney, Agent, or Firm* — Hogan Lovells US LLP

(57) ABSTRACT

A computing device can determine visual words for images in a first set of images associated with a description that includes a term. Each visual word can describe pixels in an image. The device can determine visual words for images in a second set of images that are associated with a description that does not include the term. The device can determine a set of visual words that are associated with the term. The device can determine regions in images corresponding to visual words in the set of visual words. The device can associate the respective determined regions for the images with the term in a database. When a search query is received that includes an image that is determined to be associated with the term, the database can be utilized to determine images responsive to the query by identifying images that are also associated with the term.

20 Claims, 17 Drawing Sheets

(51) Int. Cl.
G06T 11/60 (2006.01)
G06K 9/32 (2006.01)

(56) References Cited

U.S. PATENT DOCUMENTS

| | | |
|---|---|---|
| 2014/0052584 A1 | 2/2014 | Gershon |
| 2016/0048536 A1* | 2/2016 | Di .................... G06F 17/30247 382/165 |
| 2016/0189286 A1* | 6/2016 | Zohar ................ G06K 9/00355 348/150 |

OTHER PUBLICATIONS

USPTO, Notice of Allowance issued in U.S. Appl. No. 14/572,532 dated Mar. 9, 2017, 9 pages.

* cited by examiner

APPROACHES FOR ASSOCIATING TERMS WITH IMAGE REGIONS

CROSS-REFERENCES TO RELATED APPLICATIONS

This application is a continuation of allowed U.S. application Ser. No. 14/572,532, entitled "APPROACHES FOR ASSOCIATING TERMS WITH IMAGE REGIONS," filed Dec. 16, 2014, which issued on Jul. 4, 2017, as U.S. Pat. No. 9,697,234, and of which the full disclosure of this application is incorporated herein by reference for all purposes.

BACKGROUND

Image matching is a fundamental technique that is being used in computer vision, object recognition, motion tracking, 3D modeling, and the like. Image matching is performed to check whether two images have the same content. The two images that need to be compared may not be exactly the same. For example, one image may be rotated or taken from a different viewpoint as compared to the other image, or it may be a zoomed version of the other image. Further, the two images may be taken under different lighting conditions. Despite such variations in the two images, they contain the same content, scene or object. Therefore, image matching techniques are used to match images effectively. However, in some instances, for example, when searching for specific visual content (e.g., a brand logo) that appears in portions of images, matching images using existing techniques may unnecessarily increase the complexity of the image matching algorithm and/or may result in many false positives.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-described deficiencies and other deficiencies in conventional approaches. In particular, various embodiments of the present disclosure can provide a method for associating portions of visual media (e.g., images or videos) with terms. For example, a brand name "Food Co." can be associated with a portion of an image that includes a logo for the brand "Food Co." In various embodiments, such associations can be determined by evaluating a first set of images that is associated with a description that includes the term being evaluated and a second set of images that is not associated with a description that includes the term. By evaluating images with respect to terms using the approaches described herein, various portions of images that visually describe features (e.g., logos, textures, patterns, colors, trade dress, etc.) that are attributable to a term (e.g., brand) can be can be associated with the term. Such associations can be utilized, for example, to provide images that are responsive to a search query that includes the term.

Other advantages, variations, and functions are described and suggested below as may be provided in accordance with the various embodiments.

Figure 1A:
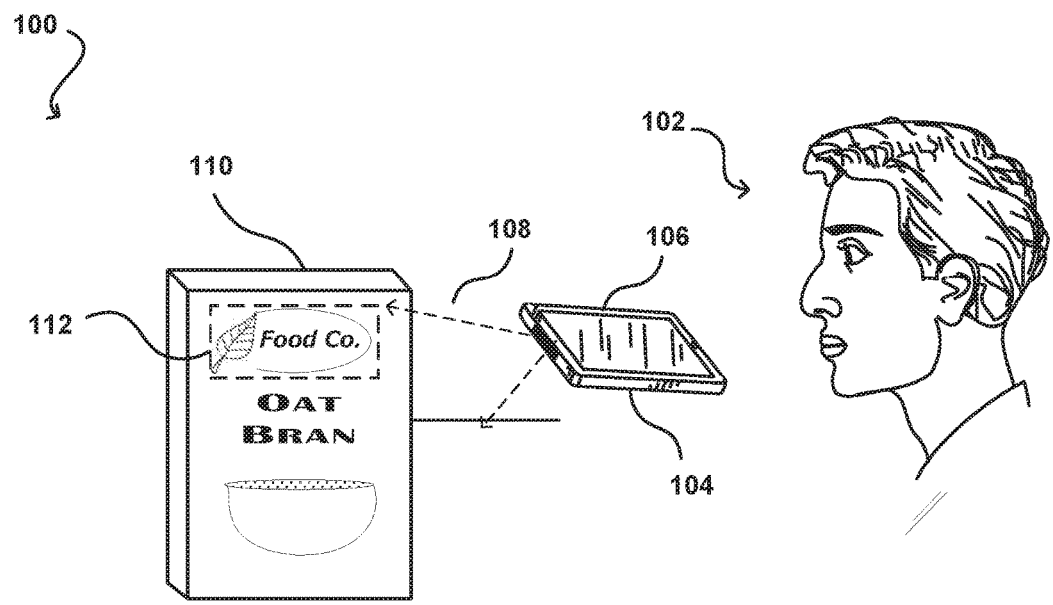
FIGS. 1(a)-(b) illustrate an example situation wherein a user is interacting with a computing device in accordance with various embodiments.

FIG. 1(a) illustrates an example situation 100 wherein a user 102 is interacting with a computing device 104. Although a portable computing device (e.g., a smart phone, an e-book reader, or tablet computer) is shown, it should be understood that various other types of electronic devices that are capable of determining and processing input can be used in accordance with various embodiments discussed herein. These devices can include, for example, desktop computers, notebook computers, personal data assistants, cellular phones, video gaming consoles or controllers, smart televisions, a wearable computer (e.g., a smart watch or glasses), and portable media players, among others. In this example, the computing device 104 has at least one image capture element 106, such as a camera or camera sensor, operable to perform functions such as image and/or video capture. In this example, the user 102 is interested in obtaining a listing of products that match a particular logo 112 of an object 110.

Figure 1B:
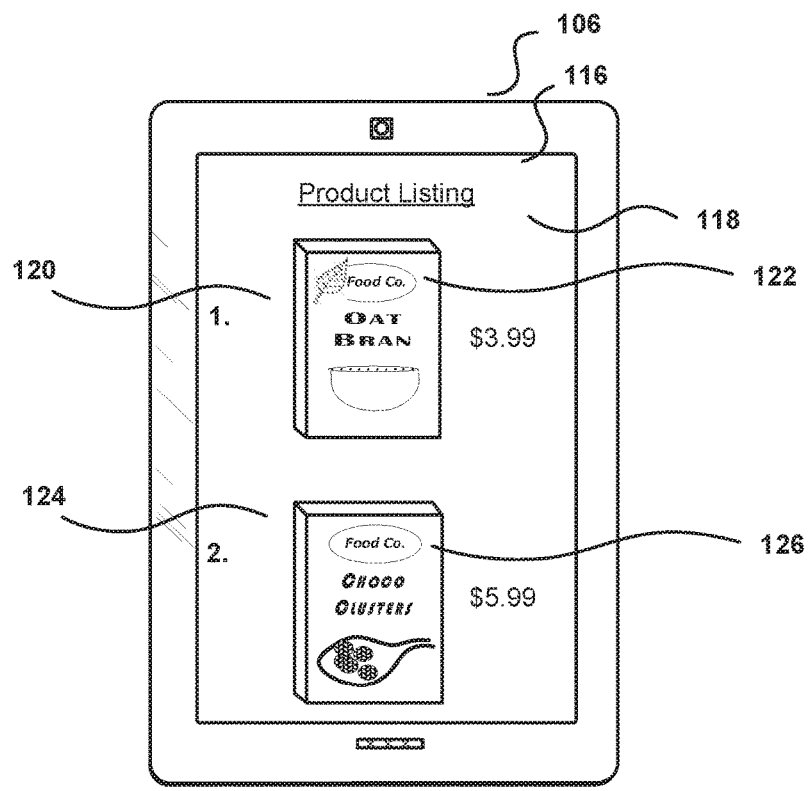

In order to obtain this information, the user can position the computing device 104 such that at least the relevant portion of the logo 112 is within a field of view 108 of at least one camera 106 of the computing device. The user 102 can capture an image or video of the logo 112 and submit the captured information to a server configured to generate a listing 118 of products that are responsive to the logo 112. The listing 118 can be generated using the approaches described throughout this specification. In various embodiments, the approaches described herein may be used to generate associations between terms and images, or portions of the images. For example, any images that contain logos used by a particular brand name can be associated with the brand name. Such information can be used to generate a database that can be utilized by the server to generate the listing 118 by determining that the logo 112 corresponds to the brand "Food Co." and then determining, using the database, other products related to the brand name based on the respective images of those products including a logo used by the brand name. The server can provide the listing 118 to the computing device 106 to be displayed on the display screen 116. The listing 118 can then be displayed on a display screen 116 of the computing device 104, as illustrated in the example situation 120 of FIG. 1(*b*). As shown in FIG. 1(*b*), the listing 118 includes various products 120, 124 that are associated with a brand corresponding to the logo 112. As illustrated, the logo 122 of the product 120 is slightly different than the logo 126 of the product 124. Despite such differences, in various embodiments, the approaches described herein are able to identify any images that include that the logos 122, 126 correspond to the same brand. Although the example of FIGS. 1(*a*)-(*b*) specifically refer to products, the approaches described herein may be applied to determining associations between various textures, patterns, colors, features, or trade dress found in visual media based on respective text describing such media.

As mentioned, the approaches described herein can be used to associate various terms (e.g., brand names) with images that include various features that have been determined to correspond to those terms. For example, a brand name "Food Co." can be associated with images that contain regions in which any of that brand's logos, textures, patterns, colors, features, or trade dress appear. Such associations can be determined, for example, by evaluating respective descriptions (e.g., titles, associated text, metadata, etc.) that correspond to the images, as illustrated in the example of FIG. 2.

Figure 2:
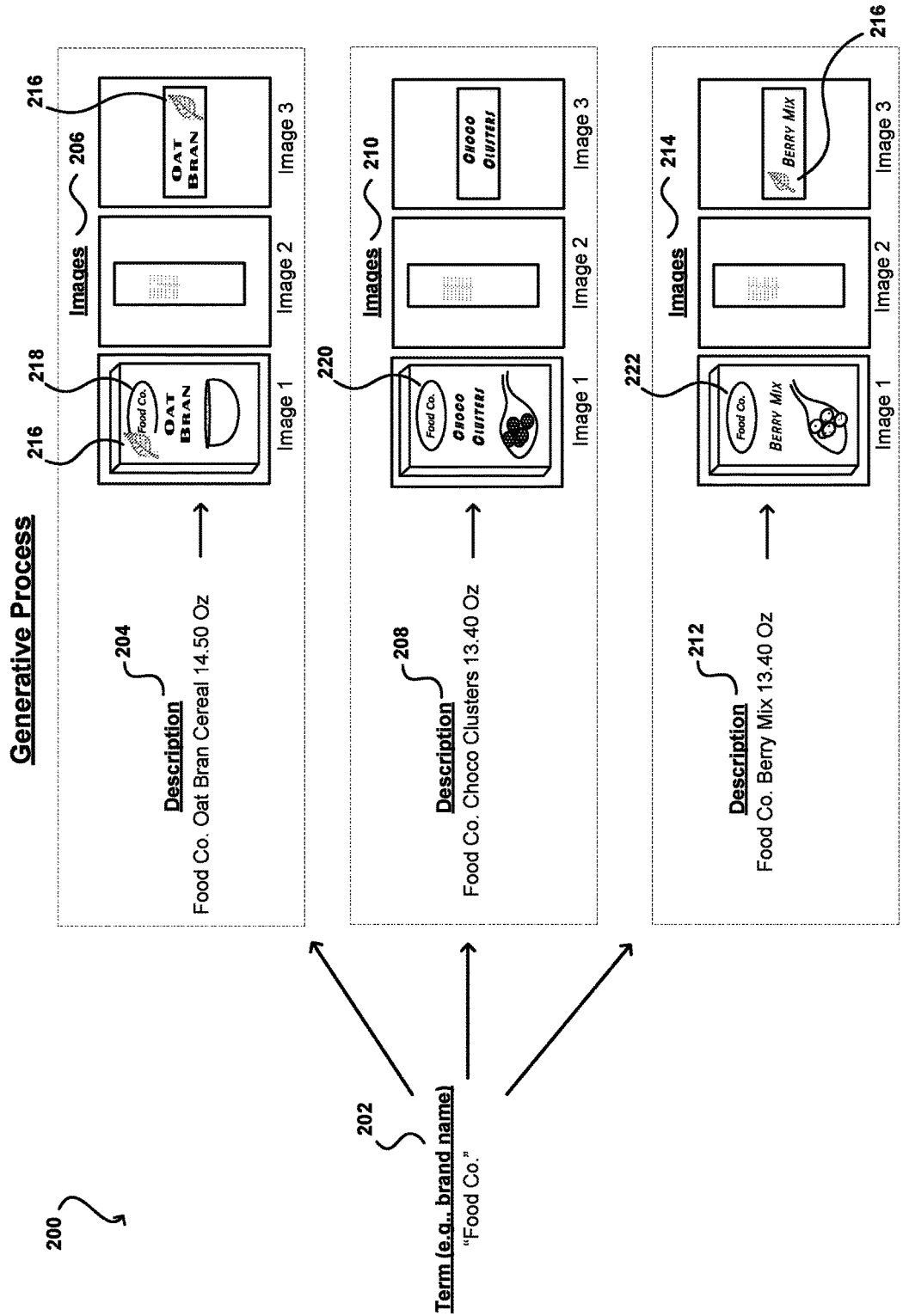
FIG. 2 illustrates an example approach for determining associations between terms and images in accordance with various embodiments.

FIG. 2 illustrates an example approach for determining associations between terms and images. In various embodiments, associations between a term and various images can be determined by evaluating respective descriptions corresponding to each of the images. Such terms may be accessed, for example, using a curated listing of brand names. Further, such images may be accessed, for example, from a curated collection of images corresponding to various products and each image can be associated with text that described the image and/or the product. Such images may also be categorized, for example, in a taxonomy. For example, an image can be categorized in a product taxonomy category "Breakfast Foods" and a sub-category "Cereal." In one example, such description can include text describing the contents of the image, a brand name, a product name, a product description, and/or a product category. As illustrated in FIG. 2, the set of images 206 for a product is associated with a description 204 "Food Co. Oat Bran Cereal 13.40 Oz," the set of images 210 for another product is associated with a description 208 "Food Co. Choco Clusters Mix 13.40 Oz," and the set of images 214 for another product is associated with a description 212 "Food Co. Berry Mix 13.40 Oz."

Although specific references to products are made in the example of FIG. 2, the approaches described herein may be applied to images have any corresponding description, including, for example, descriptions that name or describe any objects (e.g., animals) appearing in the images.

In various embodiments, such descriptions 204, 208, 212 are processed to eliminate any special characters or symbols, for example, any non-alphabet characters, that appear in the respective descriptions. Once such processing is complete, for each description, any terms appearing in that description are tokenized, for example, into bi-grams, tri-grams, etc. For example, the description "Food Co. Oat Bran Cereal 14.50 Oz" can be tokenized into the bi-grams: "Food Co.," "Co. Oat," "Oat Bran," "Bran Cereal," "Cereal 14.50," and "14.50 Oz."

Once the tokenization of the descriptions is complete, the sets of images 206, 210, 214 can be evaluated to extract image features and subsequently determine any "visual words" corresponding to each image. In the example of FIG. 2, each image in a set of images can capture a view (e.g., top, bottom, front, side, profile, etc.) of a product. Each image in the set can be processed to extract local feature descriptors. For example, an image can be analyzed to identify features in the image. Such features can be determined, for example, be analyzing the image content to identify edges that that meet at some point (e.g., "corner"). Images containing identical or similar content will typically have a set of features that can be repeatedly extracted. A region in the image can be determined based on the point at which two edges meet and this region can be evaluated to determine a corresponding feature descriptor. For example, gradients that are in or surround the region can be described in a feature descriptor of some dimension (e.g., a 64-dimension feature descriptor). For any given image, a threshold number (e.g., 500 to 1,500) of "corners" can be evaluated to determine corresponding feature descriptors. Approaches for determining such feature descriptors are discussed below in FIGS. 9-27 and also in U.S. Pat. No. 8,406,507, issued Mar. 26, 2013, entitled "Method and System for Representing Image Patches," which is incorporated by reference herein.

Once feature descriptors for the image have been extracted, any visual words corresponding to the image can be determined by clustering the extracted feature descriptors. In various embodiments, each feature descriptor that was identified in the image corresponds to a visual word. Thus, a visual word can be seen as a cluster of image features having the same or similar visual characteristics. Such matching or similar visual characteristics may correspond to, for example, any particular logos, textures, patterns, colors, features, trade dress, etc. Approaches for determining visual words are discussed below in FIGS. 9-27 and also in U.S. Pat. No. 8,756,216, issued Jun. 17, 2014, entitled "Scalable Tree Builds for Content Descriptor Search" and in U.S. Pat. No. 8,352,483, issued Jan. 8, 2013, entitled "Scalable Tree-based Search of Content Descriptors," both of which are incorporated by reference herein.

Using the approaches described above, each image in the collection of images (e.g., sets of images 206, 210, 214) can be associated with a set of visual words determined for that image, together with a set of tokens extracted from the description associated with the image. Based on this information, associations between terms and images can be determined.

For example, in various embodiments, for a term 202 (e.g., brand name) "Food Co.," any images that include the term 202 (e.g., "Food Co.") in the respective description associated with the image are identified. For example, for the term "Food Co.," any images having a description that includes the term "Food Co." can be identified. As illustrated in FIG. 2, the images in the sets 206, 210, 214 are each associated with a respective description 204, 208, 212 that includes the term "Food Co." Thus, in the example of FIG. 2, images in each of the sets 206, 210, 214 are identified. The identification of such images can be facilitated by matching the term "Food Co." with tokens in the set of tokens (e.g., bi-grams, tri-grams, etc.) extracted from the descriptions associated with the images, as described above.

Once images 206, 210, 214 that include the term 202 in their respective descriptions 204, 208, 212 are identified, such images can be further evaluated to identify any visual words that are common among the images. As mentioned, each image can be associated with a set of visual words that were determined by processing the respective content in each of the images. Thus, for each image in the set 206, 210, 214 visual words that are shared among the images are identified. One example approach for identifying common visual words involves generating a histogram of visual words that were determined for the images in the sets 204, 208, 212.

Another approach is a "generative process" that identifies common visual words by performing a pairwise comparison of images in the sets 206, 210, 214 and incrementing respective counts for any visual words that co-occur in the image pair being compared. Thus, each image in the sets 206, 210, 214 is compared with another image from the sets 206, 210, 214, and respective counts for any visual words that co-occur in the image pair are incremented. This technique can be used to prioritize any visual words that co-occur often across the images in the sets 206, 210, 214. However, simply prioritizing co-occurring visual words can be over-inclusive in that any common visual words are prioritize even though such visual words may not correspond to the term 202 (e.g., brand name). For example, in FIG. 2, the leaf icon 216 appearing in some of the images in the sets 206, 214 may be a visual word that was determined for several images in the sets 206, 210, 216. However, the leaf icon 216 may not necessarily be exclusive to the term 202 (e.g. "brand name") "Food Co.," since, unlike logo 218, some logos 220, 222 for "Food Co." also appear in the images without the leaf icon 216.

Figure 3:
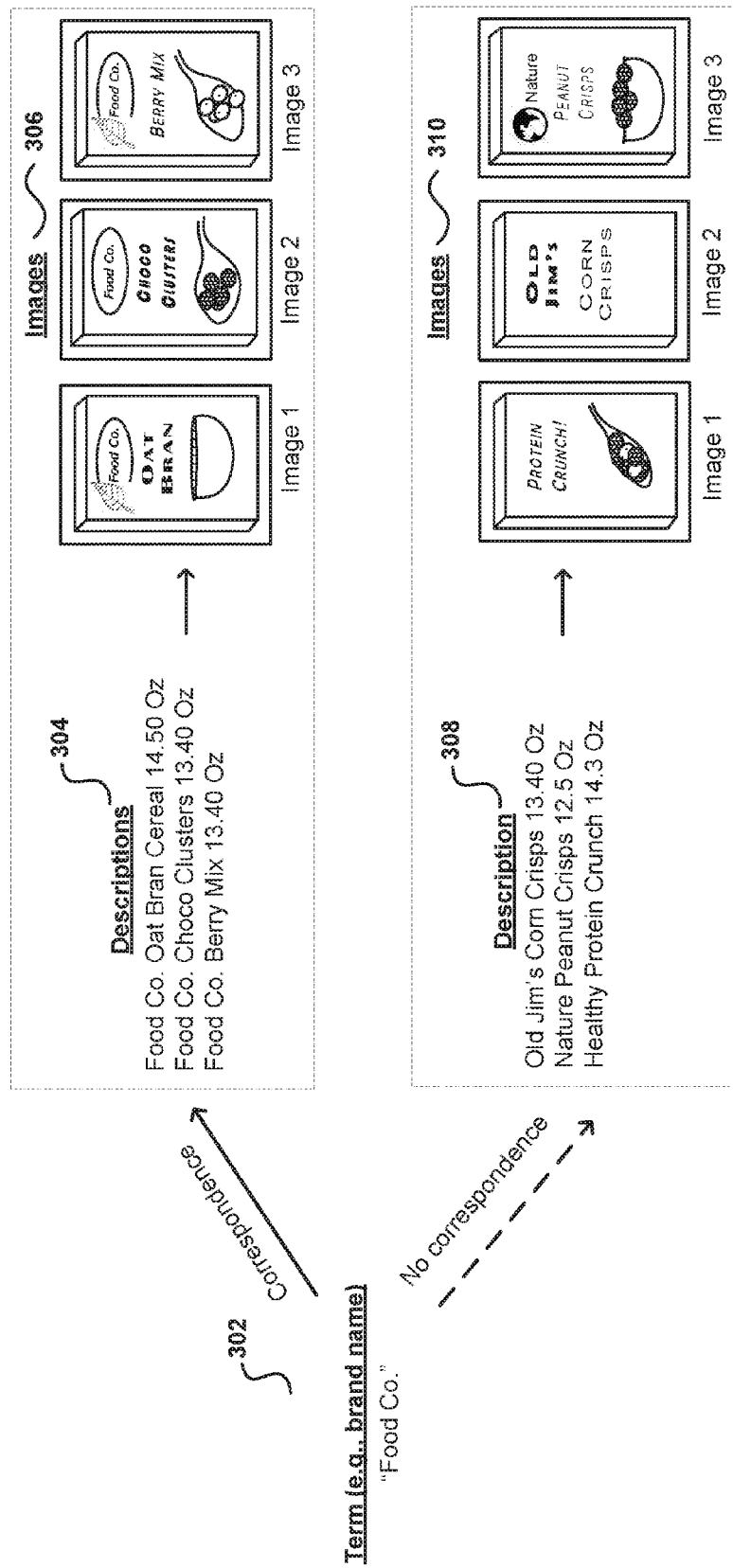
FIG. 3 illustrates an example approach for determining associations between terms and images in accordance with various embodiments.

Therefore, in various embodiments, any visual words that are common in the images but are not exclusive to the term 202 are de-prioritized using a "discriminative process," as illustrated in the example of FIG. 3. As shown in FIG. 3, the discriminative process involves de-prioritizing any visual words that co-occur in images 306 that include the term 302 in their respective descriptions 304 and in images 310 that do not include the term 302 in their respective descriptions 308. In various embodiments, images that do not include the term 302 can be selected from the same or similar category (e.g., product category) as the images 306 that do include the term in their respective descriptions 304.

For example, a pairwise comparison is performed of an image in the set 306 that includes the term 302 "Food Co." in its corresponding description 304 and an image in the set 310 that does not include the term 302 "Food Co." in its corresponding description 308. As mentioned, images may be obtained from a curated collection of images corresponding to various products and each image can be associated with text that described the image and/or the product. As described in reference to the example of FIG. 2, the images in the set 306 are categorized in category "Breakfast Foods" and a sub-category "Cereal." Typically, images or products in the same or similar category may include various features that are common among the images or products but not necessarily exclusive to a particular product. For example, the images of several different breakfast cereal brands (e.g., "Food Co." and "Old Jim's") may include a logo or design indicating that the cereal is "Heart Healthy." Such logos or designs would typically be determined to co-occur between the images using the generative process described above, however, such logos or designs are not necessarily exclusive to a brand of breakfast cereal "Food Co." or "Old Jim's."

Thus, in various embodiments, when selecting the set 310 of images that do not include the term "Food Co." in their respective descriptions, such images can also be selected from the category "Breakfast Foods" and a sub-category "Cereal" to allow de-prioritization of any logos or designs that are common among the products in the images 310 but not necessarily relevant or exclusive to the term 202 "Food Co." To perform the discriminative process, a pairwise comparison of images in the set 306 (i.e., the set of images in which the term 302 appears in the descriptive texts 304) and in the set 310 (i.e., the set of images in which the term 302 does not appear in the descriptive texts 308) is performed. Thus, each image in the set 306 is compared with another image from the set 310, and respective counts for any visual words that co-occur in the image pair are incremented using a set of counts that is different from those determined in the generative process described above in reference to FIG. 2.

The counts for any visual words that co-occur in images as determined using the approaches described in FIGS. 2 and 3 can be used to determine respective probabilities for whether any visual words determined from the images correspond to the term 302.

One example equation for determining a probability that a visual word w corresponds to the term 302 is:

$$P(B \mid w) = \frac{P(w \mid B)P(B)}{P(w)} = \frac{P(w \mid B)P(B)}{\sum_k P(w \mid B_k)P(B_k)} \quad \text{(Equation 1)}$$

where w is the visual word and B is the set of images that include the term 302 in their respective descriptions.

The denominator in Equation 1 can be considered constant or marginalized over all classes $B_k$. In this formulation of Equation 1, two classes are considered B (i.e., the set of images that include the term 302 in their respective descriptions) and $\overline{B}$ (i.e., the set of images that do not include the term 302 in their respective descriptions). Thus, in this formulation, Equation 1 can be represented as:

$$P(B \mid w) = \frac{P(w \mid B)P(B)}{P(w \mid B)P(B) + P(w \mid \overline{B})P(\overline{B})} \quad \text{(Equation 2)}$$

where w is the visual word, B is the set of images that include the term 302 in their respective descriptions, and $\overline{B}$ is the set of images that do not include the term 302 in their respective descriptions.

In various embodiments, if the probabilities P(B) and P($\overline{B}$) are considered equal, they can be factored out of Equation 2 and the equation can be represented as:

$$P(B \mid w) = \frac{P(w \mid B)}{P(w \mid B) + P(w \mid \overline{B})} \quad \text{(Equation 3)}$$

where w is the visual word, B is the set of images that include the term 302 in their respective descriptions, and $\bar{B}$ is the set of images that do not include the term 302 in their respective descriptions.

The probability P (w|B) can be determined using information from the generative process described above in reference to FIG. 2. One example equation for determining P(w|B) is:

$$P(w|B) = \frac{C}{P} \quad \text{(Equation 4)}$$

where C is the number of times the visual word w co-occurs in pairwise comparisons of images in which the term 302 appears in the descriptive texts, as described in reference to FIG. 2, and where P is the total number of image pairs in the set of images in which the term 302 appears in the descriptive texts.

The probability P (w|$\bar{B}$) can be determined using information from the discriminative process described above in reference to FIG. 3. One example equation for determining P (w|$\bar{B}$) is:

$$P(w|\bar{B}) = \frac{D}{Q} \quad \text{(Equation 5)}$$

where D is the number of times the visual word w co-occurs in pairwise comparisons between images in which the term 302 appears in the descriptive texts and images in which the term 302 does not appear in the descriptive texts, as described in reference to FIG. 3, and where Q is the total number of image pairs compared between images in the set of images in which the term 302 appears in the descriptive texts and images in the set of images in which the term 302 does not appear in the descriptive texts.

Figure 4:
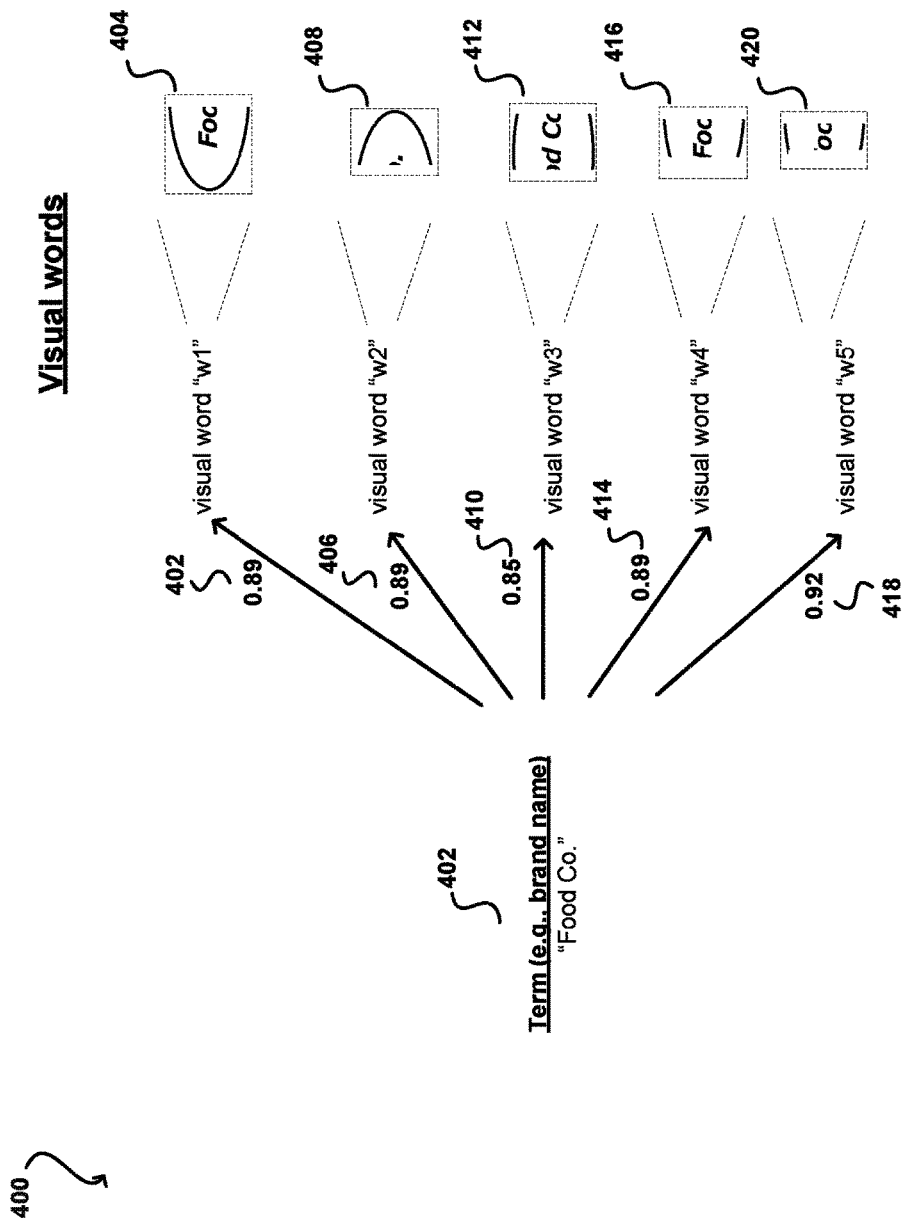
FIG. 4 illustrates example visual words with a corresponding probability indicating how closely a visual word was determined to correspond to a term in accordance with various embodiments.

A probability can be determined for each visual word extracted from the images above using the approaches described above, as illustrated in FIG. 4. FIG. 4 illustrates example visual words 404, 408, 412, 416, 420 that were extracted and each is illustrated with a corresponding probability 402, 406, 410, 414, 418 indicating how closely a visual word was determined to correspond to the term 402 using the approaches above. Each visual word describes some portion of an image (e.g., group of pixels) that was determined to be relevant to the term 402 using the approaches described above. Visual words that satisfy a threshold probability can be utilized to identify regions (e.g., a bounding box of pixels) that are related or associated with the term 402 in other images. A threshold probability may be determined, for example, using a validation set of images. For example, the threshold probability can be determined by manually identifying regions of interest in images of a test set of images that correspond to the term 402. The approaches described herein can then be performed on the test set of images using different threshold probabilities and a determination can be made as to which threshold probability or probabilities match, or provide the closest match, between image regions for the term 402 as determined using the approaches herein and the regions in the images that were identified manually.

Figure 5C:
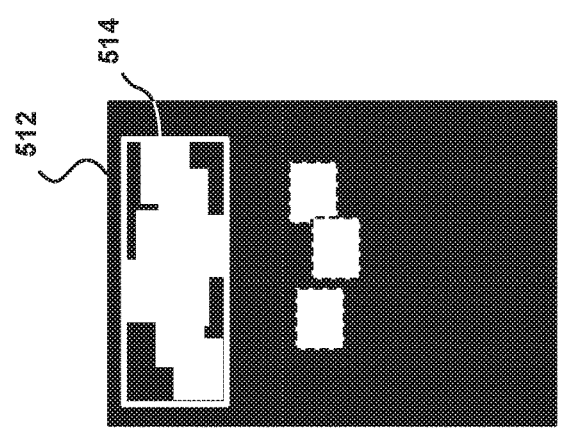
FIGS. 5(a)-(c) illustrate an example approach for determining a region in an image that corresponds to a term in accordance with various embodiments.
Figure 5B:
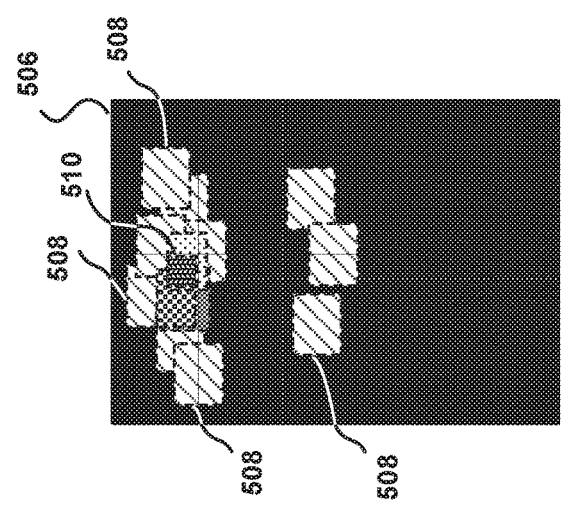
Figure 5A:
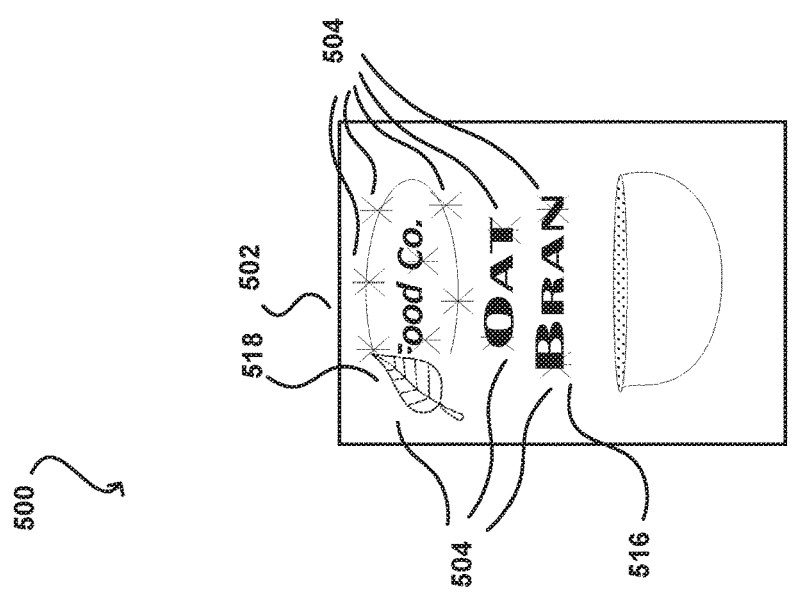

As illustrated in FIGS. 5(a)-(c), in various embodiments, visual words that satisfy a threshold probability are utilized to identify image regions (e.g., a bounding box of pixels) that are related or associated with a particular term (e.g., term 402) for images in which the term 402 appears in the descriptive text associated with the term 402 (e.g., the sets 204, 208, 212 described above in reference to FIG. 2).

In the example situation 500 of FIG. 5(a), visual words 504 are determined for an image 502 using the techniques described above. Next, the value for each pixel in the image 502 can be set (e.g., to "0" or zero), so that the entire image 506 is one color, e.g., black, as illustrated in FIG. 5(b). A respective boundary 508 for each visual word 504 is determined. For example, a bounding box 508 can be determined to encompass a set of pixels that correspond to a visual word 504. The pixel value for each pixel encompassed by a bounding box 508 can be incremented by one, as illustrated in FIG. 5(b). Thus, any pixel(s) shared or encompassed by two respective bounding boxes for two visual words will have its pixel value incremented twice. By incrementing the pixel values for such shared pixels, the image 506 can be utilized as a heatmap with any portions of the image 506 having the most overlapping boundaries corresponding to visual words having the highest pixel values or intensity. The pixel 510 in the image 506 having the most intensity, as determined by the pixel value, can be selected. The image 506 can then be binarized, for example, using a threshold value of zero ("0"). That is, the pixels within any boundaries of any visual words are set to the same color, e.g., white, as illustrated in the image 512 in FIG. 5(c).

Using the image 512, a bounding box for the portion of the image that is determined to correspond to the term (e.g., term 502) can be determined. For example, using the selected pixel 510 having the highest intensity, each pixel adjacent to the pixel 510 in the image 512 can be evaluated to determine whether the adjacent pixel is connected to the pixel 510. A pixel may be connected to an adjacent pixel if that pixel exceeds the threshold value of zero, for example. In other words, any adjacent pixel that has at least a pixel value of one or more is determined to be connected to the pixel 510. Once all connected pixels have been identified, the bounding box 514 that encompasses the connected pixels can be determined. The bounding box 514 identifies the portion of the image 502 that corresponds to the term being evaluated (e.g., term 402). Thus, for example, data describing the bounding box 514 can be stored and associated with the term 402 "Food Co." When a query for the term "Food Co." is received, the data describing the bounding box 514 can be used to identify the image 502 and also identify which region in the image 502 corresponds to the term "Food Co." The approach described above can be repeated to identify regions in the image 502 that correspond to other terms. For example, the approach described above can be repeated for the term "Oat Bran" to identify a region 516 in the image 502 that corresponds to the term "Oat Bran." As mentioned, the approaches described above are not limited to identify portions of images that specifically include text that corresponds to a term but rather may be applied to determining associations between terms and various textures, patterns, colors, features, or trade dress found in visual media. For example, the region corresponding to the leaf logo 518 in the image 502 may be associated with the term "Food Co." if a bounding box was determined for that region based on the approaches described above.

Figure 6:
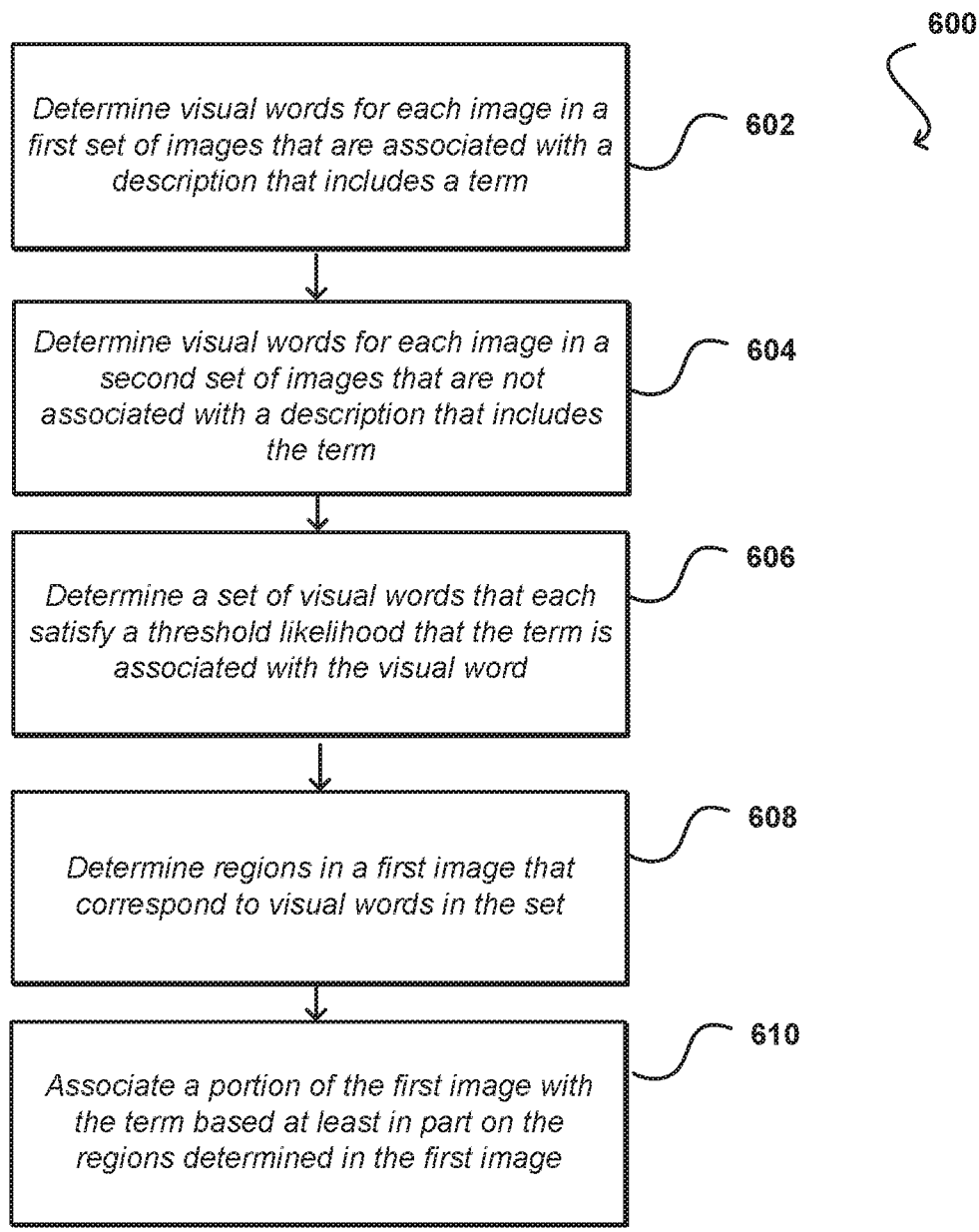
FIG. 6 illustrates a flow diagram of an example process for determining associations between terms and images in accordance with various embodiments.

FIG. 6 illustrates a flow diagram of an example process 600 for determining associations between terms and images in accordance with various embodiments. The example process 600 is provided merely as an example and additional or fewer steps may be performed in similar or alternative orders, or in parallel, within the scope of the various embodiments described in this specification.

A computing device determines 602 respective visual words for each image in a first set of images. Each visual word can describe a set of pixels in the image. Further, each image in the first set of images is associated with a description (e.g., a product description) that includes a term. The computing device determines 604 respective visual words for each image in a second set of images. Each image in the second set of images is not associated with a description that does not include the term. That is, for example, any descriptions (e.g., product descriptions) for images in the second set do not include or reference the term included in the descriptions for the first set of images.

The computing device determines 606 a set of visual words from the visual words determined for images in the first set of images and from visual words determined for images in the second set of images. Each visual word in the set of visual words satisfies a threshold likelihood that the term is associated with the visual word. The computing device determines 608 regions in a first image that is associated with a description that includes the term. Each region corresponds to at least one visual word in the set of visual words that satisfy the threshold likelihood. The computing device 610 associates a portion of the first image with the term. The portion of the first image includes at least some of the regions that each correspond to at least one visual word in the set of visual words.

Figure 7:
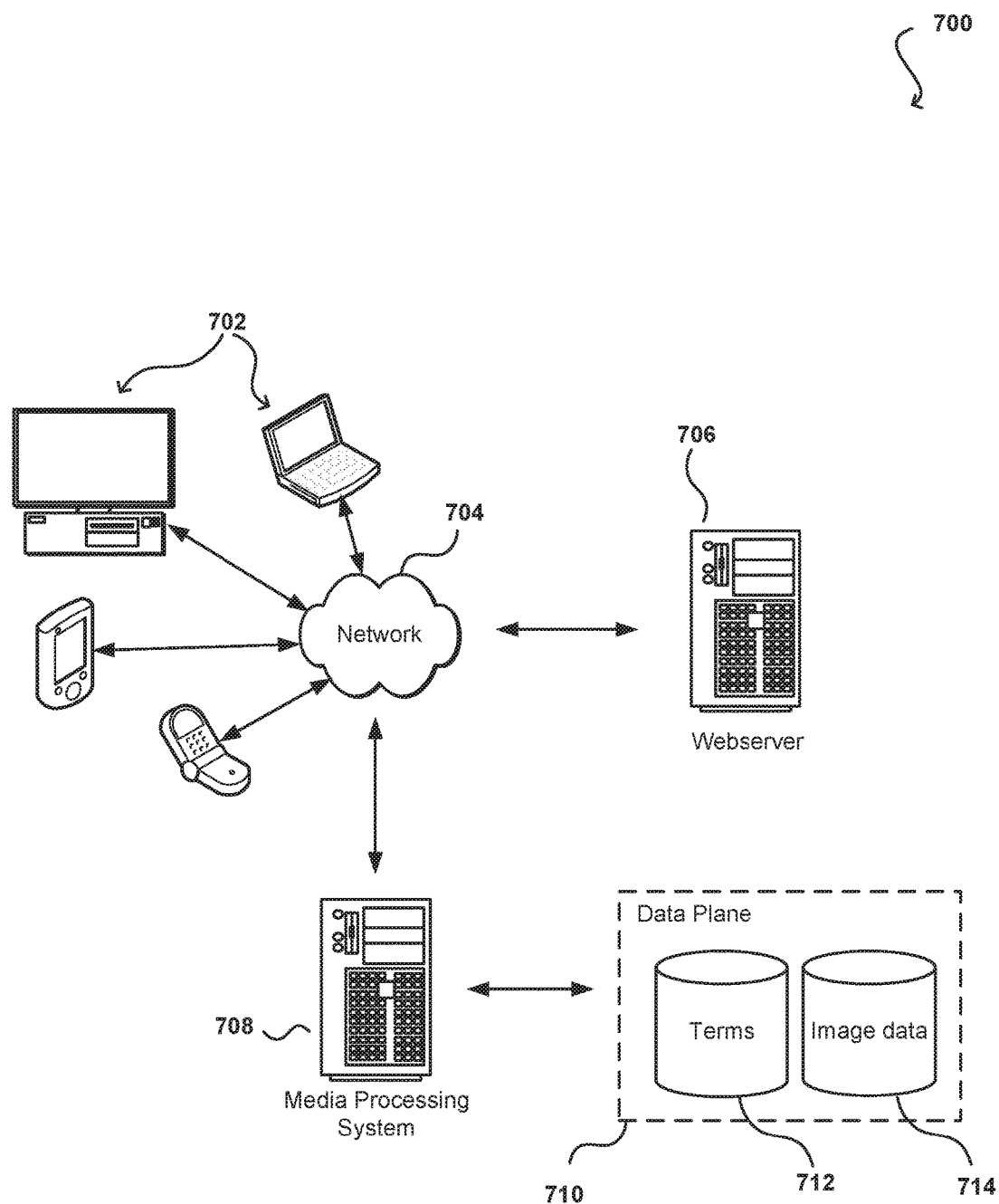
FIG. 7 illustrates an example of an environment for implementing aspects in accordance with various embodiments.

FIG. 7 illustrates an example of an environment 700 for implementing aspects in accordance with various embodiments. Although a web-based environment is described for purposes of explanation, different environments may be used, as appropriate, to implement various embodiments.

The example environment 700 includes a webserver 706, a media processing system 708, and a data plane 710. The media processing system 708 is an example of a data processing system implemented as computer programs on one or more computers in one or more locations, in which the systems, components, and techniques described throughout this specification can be implemented.

A user can interact with the webserver 706 and the media processing system 708 through a client device 702. For example, the client device 702 can be a computer coupled to the webserver 706 and the media processing system 708 through a data communication network 704, e.g., the Internet. The client device 702 generally includes a memory, e.g., a random access memory (RAM), for storing instructions and data, and a processor for executing stored instructions. The client device 702 can be any appropriate device operable to send and receive requests, messages, or other types of information over the network 704. The client device 702 can also include a display screen though which a user interacting with the client device can view information, e.g., website content. Some examples of client devices include personal computers, cellular phones, handheld messaging devices, laptop computers, set-top boxes, personal data assistants, electronic book readers, tablet devices, and the like.

The network 704 can include any appropriate network, including an intranet, the Internet, a cellular network, a local area network, a wide area network, or any other such network, or combination thereof. Components used for such a system can depend at least in part upon the type of network, the environment selected, or both. Protocols and components for communicating over such a network are well known and will not be discussed herein in detail. The client device 702 can communicate over the network using wired or wireless connections, and combinations thereof.

A user can interact with a software application, e.g., a web browser, that is running on the client device 702 to access content, e.g., webpages, being hosted by the webserver 706. The software application can be configured to obtain the content from the webserver 706, and to render that content on a display screen of the client device 702. In some embodiments, once content is obtained from the webserver 706, the client device 702 can send the obtained content to the media processing system 708 for processing. The media processing system 708 can process the media, e.g., images and videos, in accordance with the embodiments described in this specification. For example, in various embodiments, the media processing system 708 is able to associate various terms (e.g., brand names) obtained from a data store 712 with images or portions of the images stored in a data store 714.

In some embodiments, the web browser running on the client device 702 is configured to perform the operations of the media processing system 708, as described above.

In some embodiments, the web server 706, the media processing system 708, and similar components, can be considered to be part of the data plane 710. The handling of all requests and responses, as well as the delivery of content between the client device 702 and the media processing system 708, can be handled by the web server 706. The web server 706 and media processing system 708 are merely example components. However, more or fewer components can be used as structured code can be executed on any appropriate device or host machine as discussed elsewhere herein.

The data plane 710 includes one or more resources, servers, hosts, instances, routers, switches, data stores, other similar components, or a combination thereof. The resources of the data plane 710 are not limited to storing and providing access to data. Indeed, there may be several product servers, layers, or other elements, processes, or components, which may be chained or otherwise configured, and which can interact to perform tasks including, for example, obtaining data from an appropriate data store. As used in this specification, the term "data store" refers to any device or combination of devices capable of storing, accessing, and retrieving data, which may include any combination and number of data servers, databases, data storage devices, and data storage media, in any standard, distributed, or clustered environment.

The data stores of the data plane 710 can include several separate data tables, databases, or other data storage mechanisms and media for storing data relating to a particular aspect. For example, the data plane 710 illustrated includes mechanisms for facilitating text recognition and object recognition. The data plane 710 is also shown to include a mechanism for storing log data, which can be used for purposes such as reporting and analysis. The data plane 710 is operable, through logic associated therewith, to receive instructions from the media processing system 708 and to obtain, update, or otherwise process data, instructions, or other such information in response thereto, as described above.

Each server typically includes an operating system that provides executable program instructions for the general administration and operation of that server, and typically will include a computer-readable medium storing instructions that, when executed by a processor of the server, enable the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment including several computer systems and components that are interconnected through one or more communication links, using one or more computer networks or direct connections. However, the system described above can be configured to operate equally well using fewer or a greater number of components than are illustrated in FIG. 7. Thus, the system 700 in FIG. 7 is provided merely as one example, and does not limit the scope of the disclosure.

Figure 8:
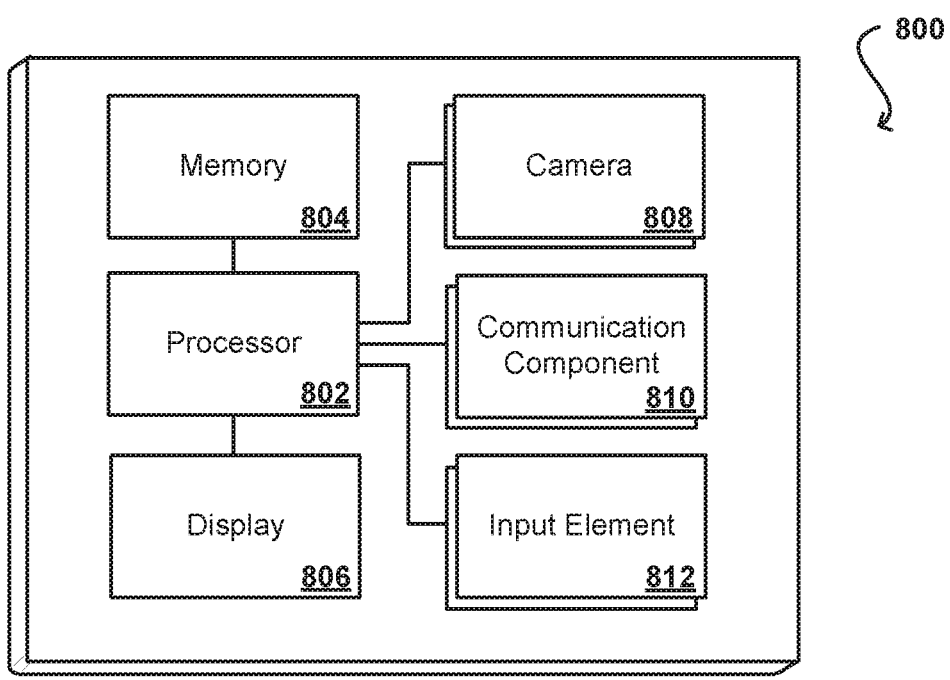
FIG. 8 illustrates example components of an example computing device that can be to implement aspects of various embodiments.

FIG. 8 illustrates a logical arrangement of a set of general components of an example computing device 800. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one image capture element 808 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 812, such as a mono or stereo microphone or microphone array, operable to capture audio information from at least one primary direction. A microphone can be a uni- or omni-directional microphone as known for such devices.

In some embodiments, the computing device 800 of FIG. 8 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 800 also can include at least one orientation or motion sensor 810. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

Figure 9:
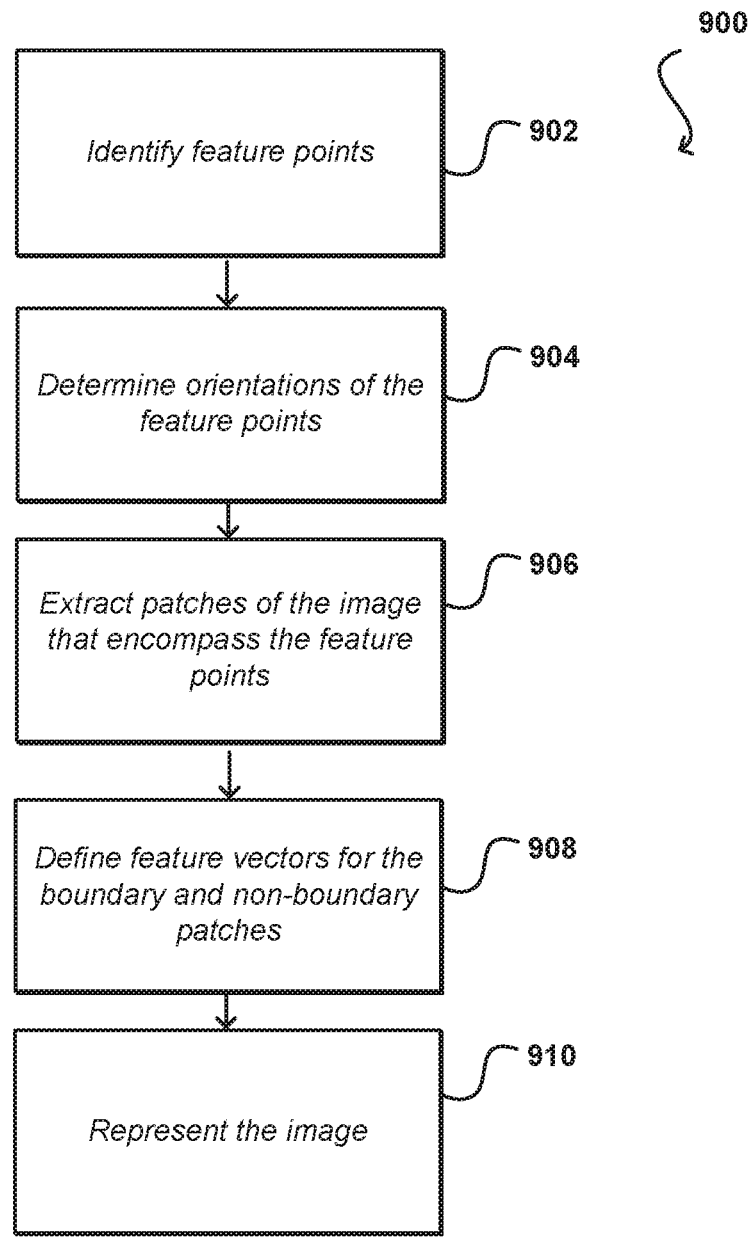
FIGS. 9-10 illustrate a flow diagram of an example process for determining a representation of an image.

FIG. 9 is a flowchart illustrating a method for representing an image. Before representing the image, it is represented as an image pyramid which contains several pyramid images. Pyramid images are smoothed and downsampled versions of the original image. Downsampling is performed by taking every other row and column from the original image. Further, smoothing or blurring of the image is performed by convolving the image with a Gaussian function. The processes of forming the image pyramid by smoothing and downsampling will be described later in detail.

At step 902, the feature points in the pyramid image are identified. The identified feature points are invariant to certain transformations of the image, like zooming, scaling and rotation of the image. The feature points are identified by finding the Harris corner measure at different points in the pyramid image. The local maxima in the Harris corner measure are identified as feature points. After identifying the feature points, their orientations are determined at step 904. The orientations are determined by using a set of orientation calculating algorithms. The orientation calculating algorithms use the gradients of the image to obtain the orientation of the feature points. For example, one algorithm may look for dominant peaks in a histogram of orientations, while another may greatly smooth the image. Thereafter, at step 906, patches of the image which encompass the feature points are extracted around the feature points. The extraction of the patch is based on the orientation of the feature point and a pre-defined sampling factor of the pyramid image. Further, the patches of the feature points that are present on the boundary of the pyramid image are extracted by padding the pyramid image with extra pixels. Thereafter, feature vectors for the boundary and non-boundary patches are defined at step 908. The boundary patches contain extra pixels in the padding of the pyramid image. At step 910, the image is represented based on the feature points, the orientations of the feature points and the feature vectors of the pyramid images.

Before applying the image matching algorithm to the image, the image is represented in the form of an image pyramid. The image pyramid contains several pyramid images. Pyramid images are smoothed and downsampled versions of the original image. Smoothing of the image is performed by convolving the image with a Gaussian function. Therefore, the image pyramid is also referred to as a Gaussian pyramid. The Gaussian function is characterized by a pre-defined scale parameter, denoted by σ, which is the standard deviation of the Gaussian function. Therefore, all the pyramid images are scaled by a pre-defined scale parameter σ, and the value of σ varies for each pyramid image.

In an embodiment of the present invention, the Gaussian pyramid consists of several octaves of images. Each octave consists of images that are the same size but different scales. For example, an octave can consist of four images, with the value of σ being distributed uniformly among the four images. The values of σ for each image in the example above can be 1, $\sqrt[4]{2}, (\sqrt[4]{2})^2, (\sqrt[4]{2})^3$ and 2. These values of σ are only for illustrative purposes, and other values of σ can also be used to form the octave. Further, the last image of an octave is downsampled to obtain the first image of the next octave. For example, the last image (with σ=2) of the example above is downsampled by a factor of 2 to obtain the first image of the next octave. In this case, every other row and column of the image is taken to form the downsampled image. The images are further downsampled to create the octaves until the size of the image falls below a minimum size, such as the size of a patch. In this manner, the whole Gaussian pyramid having several octaves of images is created.

In another embodiment of the present invention, upsampling algorithms are used to increase the size of the image before building the Gaussian pyramid of the image. The images are up-sampled if the initial size of the image is less than an upsampling threshold. For example, the value of the upsampling threshold can be predetermined as 120,000 (400×300). Note that any other value of the upsampling threshold may be chosen in other embodiments, according to different applications of the image matching algorithm. Further, the images are upsampled by inserting a row and column of pixels between every adjacent rows and columns of the original image. The values in the inserted rows and columns are determined by applying bilinear interpolation to the values present in the original image. The upsampling process is performed once and not repeatedly, since upsampling does not create any new information in the image.

In another embodiment of the present invention, when the size of the original image is larger than a downsampling threshold, the images are repeatedly smoothed and downsampled before building the Gaussian pyramid of the image. For example, the downsampling threshold can be predetermined as 1,300,000. Note that any other value of the downsampling threshold may be chosen in other embodiments, according to different applications of the image matching algorithm. The image is smoothed by convolving the image with a Gaussian function whose scale parameter σ is 0.8. Further, the image is downsampled by a factor of 2 by selecting every other row and column from the image to obtain a downsampled image.

Figure 10:
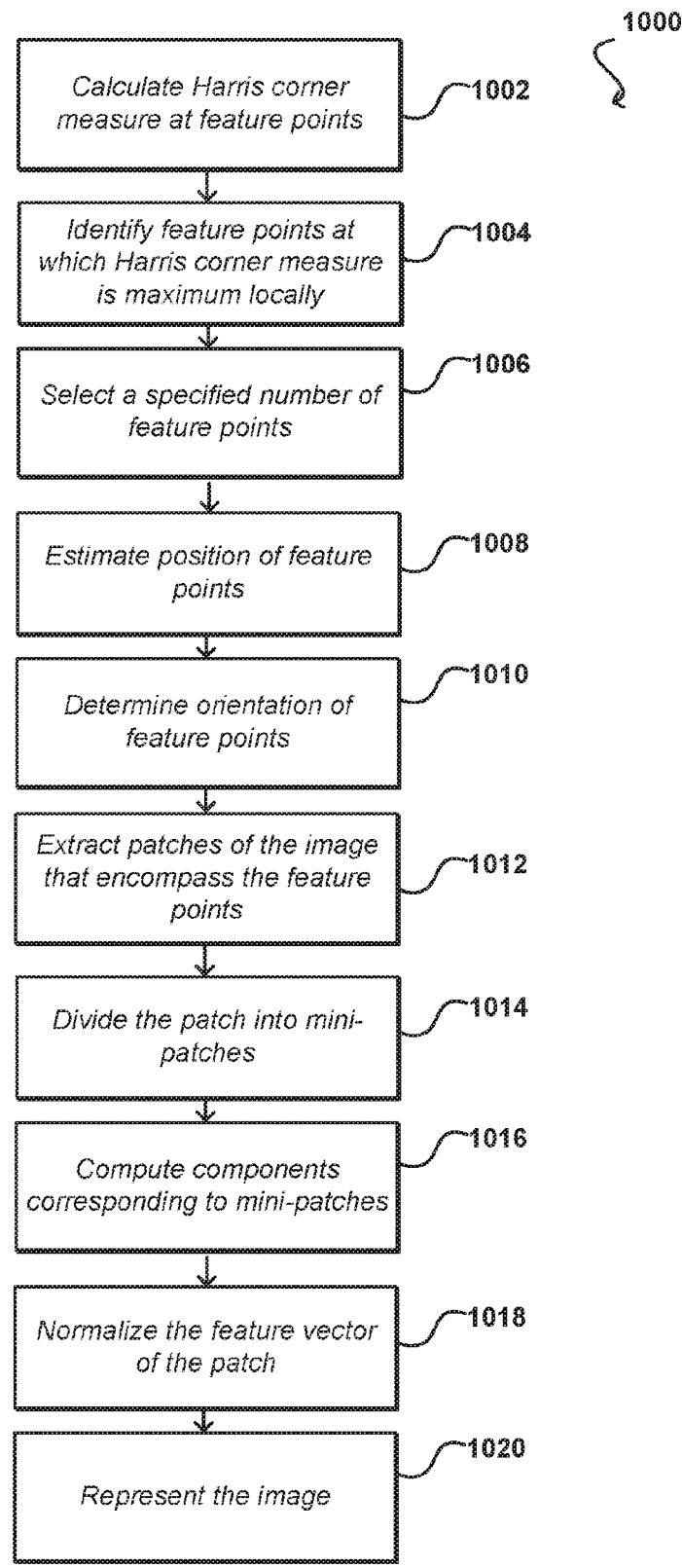

After representing the image in the form of the image pyramid, the image is represented in the form of feature points, feature point orientations and feature vectors. FIG. 10 represents a flowchart that illustrates a detailed method for representing an image. Steps 1002-1020 of FIG. 10 are performed separately on the pyramid images of the Gaussian pyramid. However, for the sake of brevity, the term 'image', instead of the term 'pyramid image', has been used.

The first step in the overall process of representing the image is to identify the feature points in the image, as stated in step 902 of FIG. 9. Feature points are a set of "interesting points" used to represent the image. The process of identifying the feature points is further explained in detail.

To identify the feature points in the image, the 'interestingness' of feature points in the image is calculated. The 'interestingness' of a feature point in the image is defined in terms of the Harris corner measure of feature points in the image. These feature points can be present in the main region of the image or on the edges of the image. The Harris corner measure is calculated at step 1002. It is based on the autocorrelation function of the image. To obtain the Harris corner measure, the image gradient is calculated from $I_x$ and $I_y$, the derivatives of the image in the x-direction and the y-direction, respectively. These derivatives are obtained by convolving the image with a kernel such as [−1 0 1] in the x-direction and in the y-direction.

The derivatives of the image are used to represent the approximate amount of shift in intensity at any point (x, y) of the image. The feature points are identified based on the shift in intensity at the features in the image. The shift in intensity at a point (x, y) is denoted by E(x, y) and represented by the relation:

$$E(x, y) = [x \ y] M \begin{bmatrix} x \\ y \end{bmatrix},$$

$$\text{where } M = \begin{bmatrix} I_x^2 & I_{xy} \\ I_{xy} & I_y^2 \end{bmatrix}.$$

The eigenvalues of the matrix M define the nature of the region of the image that surrounds the point (x, y). If both eigenvalues are small, it indicates that the region is flat and no variations are present in the region. If exactly one eigenvalue is large, it indicates that the region contains an edge. If both eigenvalues are large, it indicates that the region contains a corner or junction. The eigenvalues are not determined directly since their calculation is a complex process. To avoid computing the eigenvalues, the determinant and trace of the matrix M are calculated. The determinant det(M) and trace trace(M) yield the product and sum of the eigenvalues. Thereafter, the Harris corner measure (H) at the point (x,y) is defined as:

$$H = \det(M)/\text{trace}(M) = (I_x^2 * I_y^2 - I_{xy}^2)/(I_x^2 + I_y^2).$$

To keep this function defined at all times, a small quantity c is added to the denominator so that it is always non-zero. Further, the elements of the matrix $M(I_x^2, I_y^2, I_{xy})$ point are obtained by convolving the image gradients with a Gaussian function. Following are the expressions to calculate these elements:

$$I_x^2 = (I_x * I_x) \bigcirc G_\sigma,$$

$$I_{xy} = (I_x * I_y) \bigcirc G_\sigma,$$

$$I_y^2 = (I_y * I_y) \bigcirc G_\sigma.$$

where $G_\sigma$ denotes the Gaussian function and is characterized by the scale parameter σ. Since multiplication is a nonlinear function, convolution with the Gaussian function is performed after the multiplication.

After calculation of the Harris corner measure at the points in the image, the feature points are identified at step 1004 as points in the image where the Harris corner measure has local maxima. The method for determining the local maxima of the Harris corner measure is explained below in detail.

In an embodiment of the present invention, a 5×5 box is used to check whether a pixel in the image is a local maximum. The 5×5 box has a radius of 2, where the radius is the radius of an imaginary circle drawn with the center taken as the center of the 5×5 box. Note that any other suitable size may be chosen to determine the maxima. The center of the box is aligned with the feature point, and the Harris corner of the points lying within the box is compared with the Harris corner measure of the center point. The center point is a local maximum if its Harris corner measure is greater than the Harris corner measure of every other point within the box. When a point is identified as a local maximum, it is added to the set of feature points. The size or radius of the box used to detect the local maximum can vary. However, a box with a radius greater than one is generally used, since it prevents the feature points from being too close.

After identifying the set of feature points based on the Harris corner measure, a specified number of feature points are selected from the set of feature points at step 1006. The selection becomes important when the image is at a high resolution or it contains a large amount of text. Such images can produce a large number of feature points, which can reduce the efficiency of the image matching algorithm. In an embodiment of the present invention, the specified number of feature points is selected based on the Harris corner measure of the feature points. In this event, the feature points are sorted in descending order of their Harris corner measure to form a list, and a specified number of feature points are selected from the top of the list. In another embodiment of the present invention, the selection of feature points can be based on the product of the Harris corner measure and the pre-defined scale parameter of the pyramid image.

At step 1008, a more refined position of feature points is estimated. The feature points identified at step 1006 have integer coordinates. However, the pixels in the image are discrete samples of the image function. Further, one pixel in the downsampled images represents a 2×2, 4×4 or 8×8 block of pixels in the original image. For these reasons, a more precise position of the feature points is estimated at a subpixel level. This process is referred to as subpixel localization.

The subpixel localization of a feature point is performed by fitting an elliptic paraboloid to a pre-defined region around the feature point. The elliptic paraboloid is fitted in such a manner that it encompasses the feature point and the value of the intensity present on those feature points. An elliptic paraboloid is a three-dimensional quadratic surface with an elliptical cross section. The pre-defined region to which the elliptic paraboloid is fitted encompasses the feature point. In an embodiment of the present invention, the pre-defined region is a 3×3 box of pixels that is centered at the feature point. The values in the 3×3 box are used to determine the coefficients of the elliptic paraboloid, from which the position of the vertex of the elliptic paraboloid is determined. The vertex represents the subpixel position of the feature point. The process of fitting an elliptic paraboloid and finding the vertex of the elliptic paraboloid is further explained in detail.

The equation of an elliptic paraboloid is: $z(x, y) = ax^2 + by^2 + cxy + cxy + dx + ey + f$, where a and b have the same sign, and where a, b, c, d, e, f are coefficients of the equation. These coefficients are generated at runtime and vary from patch to patch. The coordinates of the vertex of this elliptic paraboloid can be determined by setting the partial derivatives of the elliptic paraboloid to zero, by using the following equations.

$$\frac{dz}{dx} = 2ax + cy + d = 0, \text{ and}$$

$$\frac{dz}{dy} = 2by + cx + e = 0.$$

The equations above are solved to obtain the x- and y-coordinates of the vertex of the elliptic paraboloid. The values of x and y are obtained as follows:

$$x = \frac{ce - 2bd}{4ab - c^2},$$

$$y = \frac{cd - 2ae}{4ab - c^2},$$

where $4ab - c^2 \neq 0$.

There can be instances in which the pre-defined region around the feature point is not approximated effectively by the elliptic paraboloid. This is determined by checking the x- and y-coordinates of the vertex. If the subpixel coordinates are greater than 1 pixel away from the center pixel, the subpixel coordinates are discarded and the integral coordinates of the feature point are used.

To determine the subpixel x- and y-coordinates of the vertex of the elliptic paraboloid, the six coefficients of the elliptic paraboloid are determined. Since the 3×3 box provides nine constraints, a least squares fit is applied to determine the coefficients. The nine constraints can be represented together as Ax=b and have the following form:

$$\begin{bmatrix} x_1^2 & y_1^2 & x_1 y_1 & x_1 & y_1 & 1 \\ x_2^2 & y_2^2 & x_2 y_2 & x_2 & y_2 & 1 \\ \vdots & \vdots & \vdots & \vdots & \vdots & \vdots \\ x_9^2 & y_9^2 & x_9 y_9 & x_9 & y_9 & 1 \end{bmatrix} \begin{bmatrix} a \\ b \\ c \\ d \\ e \\ f \end{bmatrix} = \begin{bmatrix} z_1 \\ z_2 \\ \vdots \\ z_9 \end{bmatrix},$$

where $x_i$ and $y_i$ are the coordinates of the pixels present in the 3×3 box. The coordinates $x_i$ and $y_i$ are relative to the center of the box, and actual coordinates can be obtained by adding the absolute coordinates of the center of the box to $x_i$ and $y_i$. After replacing the values of $x_i$ and $y_i$ in the equation above, the following matrix equation is obtained:

$$\begin{bmatrix} 1 & 1 & 1 & -1 & -1 & 1 \\ 0 & 1 & 0 & 0 & -1 & 1 \\ 1 & 1 & -1 & 1 & -1 & 1 \\ 1 & 0 & 0 & -1 & 0 & 1 \\ 0 & 0 & 0 & 0 & 0 & 1 \\ 1 & 0 & 0 & 1 & 0 & 1 \\ 1 & 1 & -1 & -1 & 1 & 1 \\ 0 & 1 & 0 & 0 & 1 & 1 \\ 1 & 1 & 1 & 1 & 1 & 1 \end{bmatrix} \begin{bmatrix} a \\ b \\ c \\ d \\ e \\ f \end{bmatrix} = \begin{bmatrix} z(-1,-1) \\ z(0,-1) \\ z(1,-1) \\ z(-1,0) \\ z(0,0) \\ z(1,0) \\ z(-1,-1) \\ z(0,1) \\ z(1,1) \end{bmatrix}.$$

To solve the matrix equation above, the following formula can be used:
$x = (A^T A)^{-1} A^T b = A^* b$. The matrix $A^*$ can be calculated since the A matrix is known:

$$A^* = \frac{1}{36} \begin{bmatrix} 6 & -12 & 6 & 6 & -12 & 6 & 6 & -12 & 6 \\ 6 & 6 & 6 & -12 & -12 & -12 & 6 & 6 & 6 \\ 9 & 0 & -9 & 0 & 0 & 0 & -9 & 0 & 9 \\ -6 & 0 & 6 & -6 & 0 & 6 & -6 & 0 & 6 \\ -6 & -6 & -6 & 0 & 0 & 0 & 6 & 6 & 6 \\ -4 & 9 & -4 & 9 & 20 & 8 & -4 & 8 & -4 \end{bmatrix}.$$

The matrix $A^*$ is used to compute the coefficients of the elliptic paraboloid. Thereafter, the coefficients are used to compute the coordinates of the vertex of the elliptic paraboloid.

After computing the subpixel location of the feature points, the orientations of the feature points are determined at step 1010. The orientations of the feature points enable the image matching algorithm to match rotated versions of the same image. Feature points may have more than one orientation associated with them. A set of orientations of feature points is calculated using a set of orientation calculating algorithms.

The first orientation calculating algorithm uses an interpolated gradient method for determining the orientation. In this method, the image derivatives $I_x$ and $I_y$ are interpolated at the subpixel location calculated at step 1008. Thereafter, the four-quadrant arctangent is computed at the subpixel location to compute the orientation.

The second orientation calculating algorithm calculates the orientation by performing a smoothing operation on the image. The smoothing operation can be performed by using a Gaussian function. In an embodiment of the present invention, the scale parameter of the Gaussian function is five. Thereafter, the interpolated gradient image method, as described by the first orientation calculating algorithm, is applied to the smoothed image to obtain the orientation. Due to the smoothing operation, the spatial coverage of this method is roughly equal to the patch size.

The third orientation calculating algorithm calculates the orientation by forming an orientation histogram. The orientation histogram has 36 bins that cover the 360 degree range of orientations. Therefore, a bin has a width of 10 degrees. A patch is selected around the feature point and a Gaussian weight is applied to the entire patch. Thereafter, the image gradient at each point in the patch is mapped to its corresponding bin in the orientation histogram. The contribution of the image gradient to the bin is equal to the product of the gradient magnitude and the Gaussian weight at that point. Once the entire orientation histogram is completed for the feature point, the highest peak in the histogram and other peaks that are at least 85 percent as high as the highest peak are identified. These peaks represent dominant values of the orientations at the feature point. Therefore, the orientation histogram method can result in multiple orientations per feature point. Further, each peak value in the histogram is localized to determine an accurate value of the peak. The localization of each peak is performed by fitting a parabola to a set of histogram values that are close to each peak.

Any of the three methods mentioned above can be used to determine the orientation of the feature points. However, there can be an event when two or all three of the methods are used for determining the orientation. In this event, multiple values of orientations are obtained for a single feature point. Some of these orientations may be close to each other. The groups of orientations that are within a pre-defined angular distance of each other are replaced by the mean of the group of orientations. In an embodiment of the present invention, if two or more orientations are within a range of 20 degrees from each other, these two or more orientations are replaced with a single orientation, which is equal to the mean of the two or more orientations. The angular wraparound is considered when the 20-degree range encompasses the 360-degree orientation.

After determining the feature points and their orientations, patches of the image which encompass the feature points are extracted around the feature points at step 1012. Patches are extracted from the image gradient and it encompasses its corresponding feature point. More specifically, the feature point is located at the center of the patch, and the size of the patch is 16×16. This is an exemplary value of the patch and any other suitable value can also be used. The patch is extracted by sampling the gradient based on the orientations of the feature point and the pre-defined sampling factor of the image. The gradient is sampled at a plurality of determined positions, which are determined based on the orientation of the feature point and the pre-defined sampling factor. More specifically, the orientation of the feature point determines a coordinate reference frame, for example by choosing the positive x-axis to be in the direction of the orientation of the patch. The spacing between the samples of gradient images is equal to the value of the pre-defined sampling factor, which is equal to its position in the octave. For instance, if the intermediate scale relative to the octave is $$\sqrt[4]{2},$$

the samples will be 1.19 pixels apart.

When the feature points lie close to the boundary of the image, a portion of the patch may lie outside the boundary of the image. To include the contribution of such feature points in the representation of the image, the image is padded with extra white pixels along the boundary of the image. Note that white is an exemplary color and that other colors may be used.

After extracting the patch around the feature point, a feature vector is defined for the patch. To define the feature vector, the patch is divided into several mini-patches at step 1014. In an embodiment of the present invention, the patch is divided into a 4×4 grid of mini-patches, each of which is 4×4 pixels in size. The division of the patch is performed to represent the relative locations of different parts of the patch in an accurate manner. Thereafter, the components corresponding to the mini-patches are extracted at step 1016. Each mini-patch has four components. Each of the four components is computed from the image gradients present in the corresponding mini-patch. The first component is the sum of all positive x-derivatives present in the mini-patch of the image. The second component is the negative of the sum of all negative x-derivatives present in the mini-patch of the image. The third component is the sum of all positive y-derivatives present in the mini-patch of the image. The fourth component is the negative of the sum of all negative y-derivatives present in the mini-patch of the image. The four components can be represented as:

$$\left[ \sum_{I_x>0} I_x - \sum_{I_x<0} I_x \sum_{I_y>0} I_y - \sum_{I_y<0} I_y \right]$$

These four components are then concatenated together across mini-patches to define a single 64-dimensional feature vector corresponding to a feature point.

After obtaining the feature vector of the feature point, the feature vector is normalized at step 1018. The normalization is performed to prevent some high-value components of the feature vector from dominating the entire feature vector. There may be a situation when a high-contrast edge is present in the patch around the feature point. In this case, the feature vector will have a few components with large values. Such feature vectors will be less robust for image matching because the small components are ignored when the few large components are present. It will also be sensitive to overall changes in contrast.

The present invention in one embodiment uses an iterative procedure, which has a fast convergence rate, to normalize the feature vector of the patch. In the first step of the iterative procedure, all the components whose values are above a pre-defined threshold are reduced to the pre-defined threshold. In the second step, the components whose values are less than the pre-defined threshold are normalized to a calculated length. The calculated length is determined based on the pre-defined threshold and the number of components that have values equal to the pre-defined threshold after the first step has been performed. In an embodiment of the present invention, the calculated length is equal to $\sqrt{1-nt^2}$, where t is the pre-defined threshold and n is the number of components at the pre-defined threshold value. The value of the pre-defined threshold may be chosen according to the requirement of the particular application. Note that the second step ensures that the entire feature vector is of unit length. Further, the first and second steps are repeated until all the components are less than or equal to the pre-defined threshold. This requirement is desirable when compressing floating-point values to single bytes effectively.

The steps mentioned above for determining the feature points, the orientations and the feature vector are performed on the pyramid image. Therefore, feature points on preferably each pyramid image are identified and their orientations and feature vectors are calculated. At step 1020, the image is represented based on the feature points, orientations and feature vectors of the pyramid images.

Figure 11:
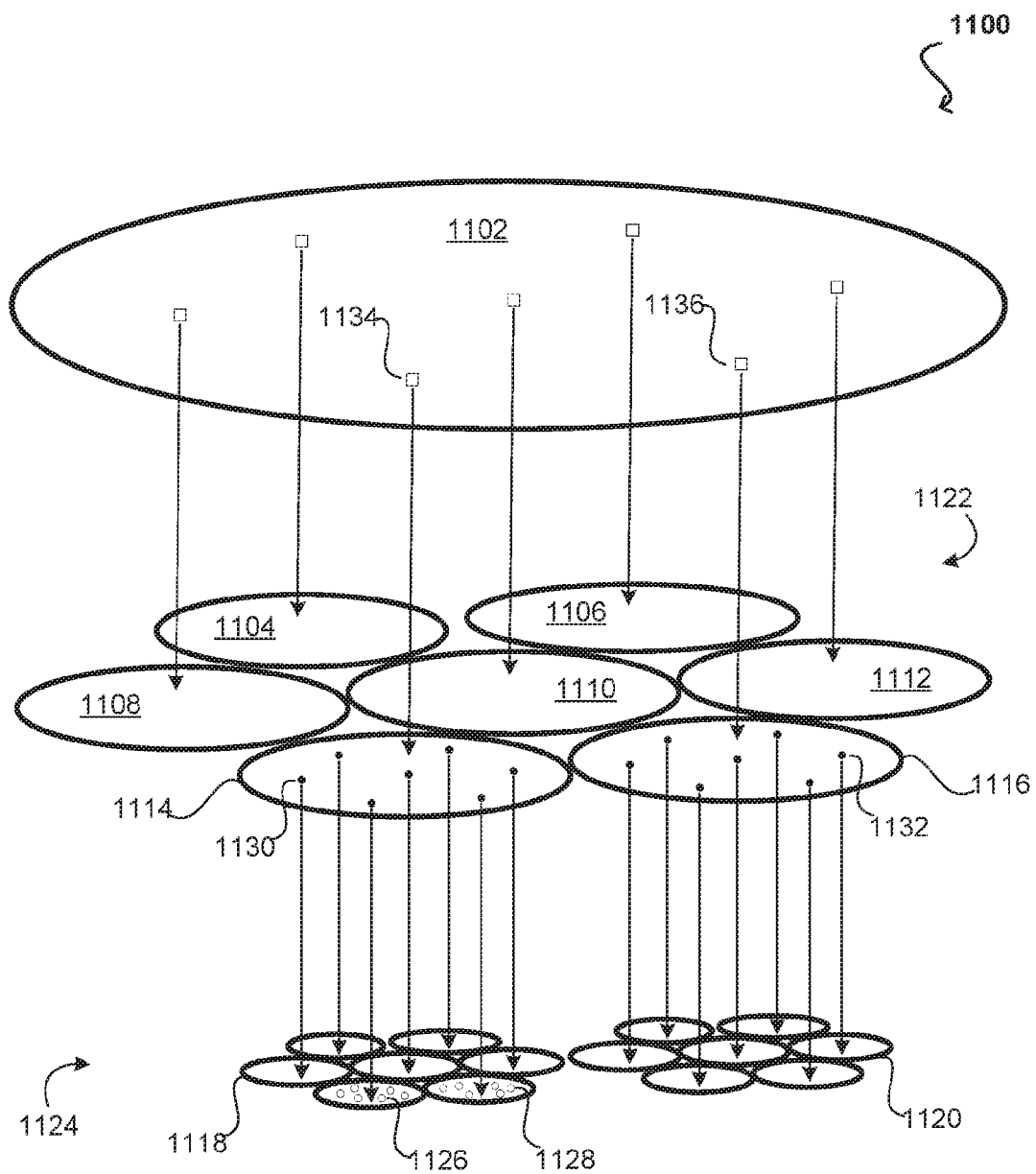
FIG. 11 is a schematic diagram depicting aspects of an example index tree in accordance with at least one embodiment.

The following disclosure describes approaches for determining and searching for visual words. Before turning to example steps that may be performed in accordance with at least one embodiment, it will be helpful to have reference to a more detailed example of the index tree. FIG. 11 depicts an example index tree 1100 in accordance with at least one embodiment. The example index tree 1100 includes a plurality of nodes 1102, 1104, 1106, 1108, 1110, 1112, 1114, 1116, 1118, 1120 arranged in a plurality of levels 1102, 1122, 1124. The node 1102 is a root node of the index tree 1100. It may be considered to reside at level 0 (or the zeroth level) of the index tree 1100. As depicted in FIG. 11, level 1 (or the first level) of the index 1100 includes nodes 1104, 1106, 1108, 1110, 1112, 1114 and 1116, while level 2 (or the second level) of the index tree 1100 includes nodes 1118, 1120 and other unlabeled nodes of similar size. A level of a particular node in the index tree 1100 may correspond to a path length between the node and the root node 1102 through the index tree 1100. Alternatively, or in addition, the root node may be considered to be a first level of the index tree 1100, and the subsequent levels 1122, 1124 to have a level number accordingly incremented by one. Nodes having higher level numbers may be considered lower in the index tree 1100 and/or beneath/below nodes having lower level numbers. Although, for clarity, this example index tree 1100 is depicted as having two levels 1122, 1124, index trees in accordance with at least one embodiment may include any suitable number of levels (e.g., 6-10).

The lowest level nodes 1124 such as nodes 1118 and 1120 reference and/or incorporate content descriptors 1126, 1128 and similar symbols (unlabeled for clarity). The content descriptors 1126, 1128 are examples of the content descriptors. Although not shown for clarity, each of the lowest level nodes 1124 may reference and/or incorporate content descriptors such as the content descriptors 1126, 1128. As described above, the content descriptors 1126, 1128 may be viewed as points in a descriptor space and/or vectors in a vector space. For illustrative clarity, the content descriptors 1126, 1128 are depicted as points in a two dimensional descriptor space (exploded by level) having a Euclidean metric, however, a descriptor space in accordance with at least one embodiment may include any suitable number of dimensions and be constructed with respect to any suitable metric. Examples of suitable metrics include an angle between feature vectors of descriptors with respect to Euclidean and non-Euclidean geometries, suitable transforms of the angle such as trigonometric transforms of the angle and hypergeometric transforms of the angle, as well as inner products of feature vectors such as a "dot product" or scalar product of feature vectors.

Each of the nodes 1102, 1104, 1106, 1108, 1110, 1112, 1114, 1116, 1118, 1120 of the index tree 1100 may by characterized and/or summarized by a node descriptor or index descriptor. For example, the nodes 1118 and 1120 may be characterized by index descriptors 1130 and 1122, respectively, and the nodes 1114 and 1116 may be characterized by index descriptors 1134 and 1136, respectively. Although it will be helpful to distinguish between index descriptors 1130, 1132, 1134, 1136 and content descriptors 1126, 1128, index descriptors 1130, 1132, 1134, 1136 may also be viewed as points in the descriptor space and/or vectors in the vector space, and may even be stored utilizing a same and/or similar data structure as content descriptors 1126, 1128. Furthermore, index descriptors 1130, 1132 may be based at least in part on content descriptors at least referenced by the nodes 1118, 1120 they characterize. For example, the index descriptor 1130 may correspond to a point in the descriptor space that is a mean and/or a center (e.g., a geometric center) of the content descriptors at least referenced by the node 1118. Similarly, index descriptors 1134, 1136 of higher level nodes 1114, 1116 may be based at least in part on index descriptors of lower level nodes (e.g., index descriptors 1130, 1132) at least referenced by the higher level nodes 1114, 1116. For example, the index descriptor 1134 may correspond to a point in the descriptor space that is a mean and/or a center (e.g., a geometric center) of the index descriptors at least referenced by the node 1114.

The size of the nodes 1102, 1104, 1106, 1108, 1110, 1112, 1114, 1116, 1118, 1120 of the index tree 1100 depicted in FIG. 11 is intended to have a geometric meaning. The nodes 1102, 1104, 1106, 1108, 1110, 1112, 1114, 1116, 1118, 1120 may correspond to a correspondingly sized region of the descriptor space. Nodes depicted as adjacent in FIG. 11, such as nodes 1104 and 1108, may correspond to adjacent regions of the descriptor space. Lowest level nodes 1124 may correspond to regions of the descriptor space containing the content descriptors at least referenced by the nodes 1124. Higher level nodes 1122 may correspond to regions of the descriptor space containing corresponding regions of lower level nodes, such as the nodes 1118 and 1120, at least referenced by the higher level nodes 1122. Although not shown for clarity in FIG. 11, each of the higher level nodes 1122 may reference multiple lower level nodes such as the nodes 1118 and 1120. The descriptor space region containment may be hierarchical. For example, the root node 1102 may correspond to a region of the descriptor space containing content descriptors at least referenced by any of the lowest level nodes 1124.

The index tree 1100 may index the set of content descriptors. That is, each of the set of content descriptors may be at least referenced by at least one of the lowest level nodes 1124. In at least one embodiment, each of the set of content descriptors is allocated to a unique one of the lowest level nodes 324 corresponding to a cluster determined with a suitable clustering technique such as k-means clustering. It is not required to determine distances in the descriptor space between a given query descriptor and each of the set of content descriptors to find a content descriptor nearest the query descriptor. In at least one embodiment, a search procedure may traverse the index tree 1100 to determine a subset of lowest level nodes 1124 nearest the query descriptor, and then compare the query descriptor to the subset of the set of content descriptors referenced by the determined (nearest) subset of lowest level nodes. For example, the distance between the query descriptor and a particular node 1114 of the index tree 1100 may be based at least in part on (e.g., be equal to) the distance between the query descriptor and the index descriptor 1134 of the node 1114 with respect to the metric of the descriptor space. Example steps for traversing the index tree 1100 in accordance with at least one embodiment are described in more detail below.

Figure 12:
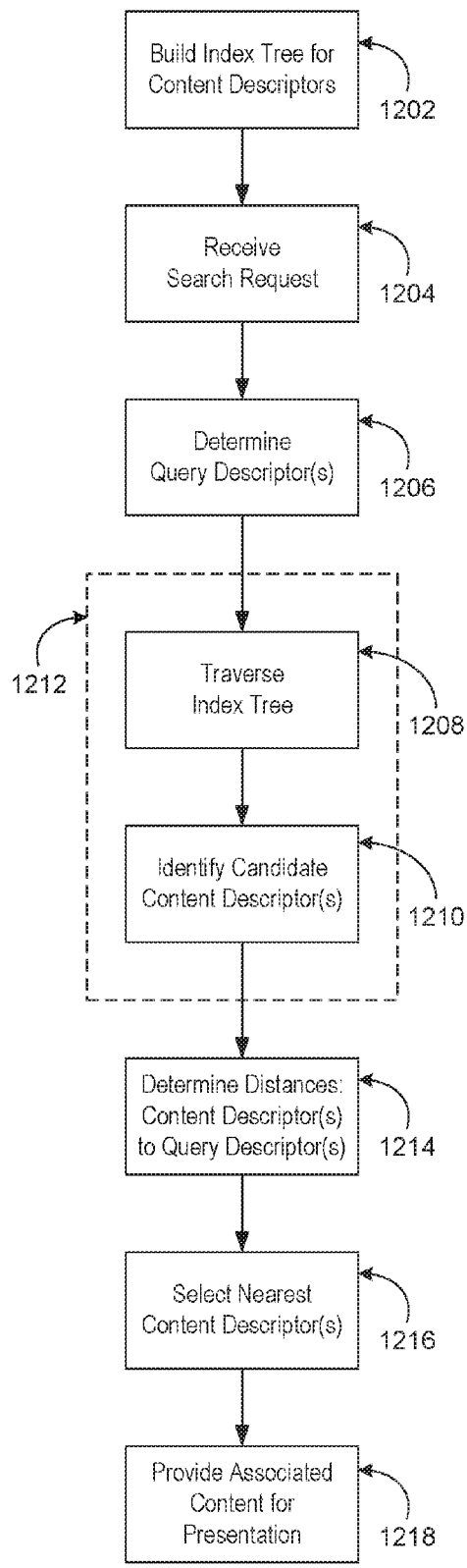
FIG. 12 is a flowchart depicting example steps for searching a collection of content in accordance with at least one embodiment.

Before describing example steps that may be incorporated in index tree traversal procedures in accordance with at least one embodiment, it will be helpful to provide an example procedural context. FIG. 12 depicts example steps for searching the collection of content in accordance with at least one embodiment. At step 1202, the index tree may be built for the set of content descriptors. Building the index tree may involve significant use of computation resources and/or time. Accordingly, step 1202 may be a preparatory step to servicing search requests and/or performed relatively infrequently with respect to search request servicing and/or according to a schedule At step 1204, a search request may be received. For example, the system may receive the search request from the client device. The search request may include at least a reference to query content. For example, the search request may include a query image or a reference, such as a uniform resource locator (URL), to the query image. At step 1206, a set of query descriptors may be determined for the query content. For example, the system may generate the set of query descriptors for the query content in a same and/or similar manner that the content descriptors were generated for the collection of content.

At step 1208, the index tree may be traversed. For example, the system may traverse the index tree to identify a subset of lowest level nodes nearest the set of query descriptors. Example steps for traversing the index tree in accordance with at least one embodiment are described below. At step 1210, a set of candidate content descriptors may be identified. For example, the system may identify the set of content descriptors at least referenced by the subset of lowest level nodes identified at step 1208 as the set of candidate content descriptors. Dashed line 1212 in FIG. 12 indicates that steps 1208 and 1210 may be integral. For example, identification of the set of candidate content descriptors may be integral to traversal of the index tree.

At step 1214, distances may be determined between each of the set of query descriptors and each of the set of candidate content descriptors. For example, the system may determine the distances with respect to the metric of the descriptor space in which the query descriptors and the content descriptors are located (e.g., as points or vectors). At step 1216, a set of nearest content descriptors may be selected. For example, the system may select a subset of the set of candidate content descriptors nearest the set of query descriptors with respect to the distances determined at step 1214. At step 1218, content in the collection associated with the set of nearest content descriptors selected at step 1216 may be provided for presentation. For example, the system may determine content in the collection that matches the set of nearest content descriptors selected at step 1216 and provide at least reference to the matching content to the client device.

Figure 13:
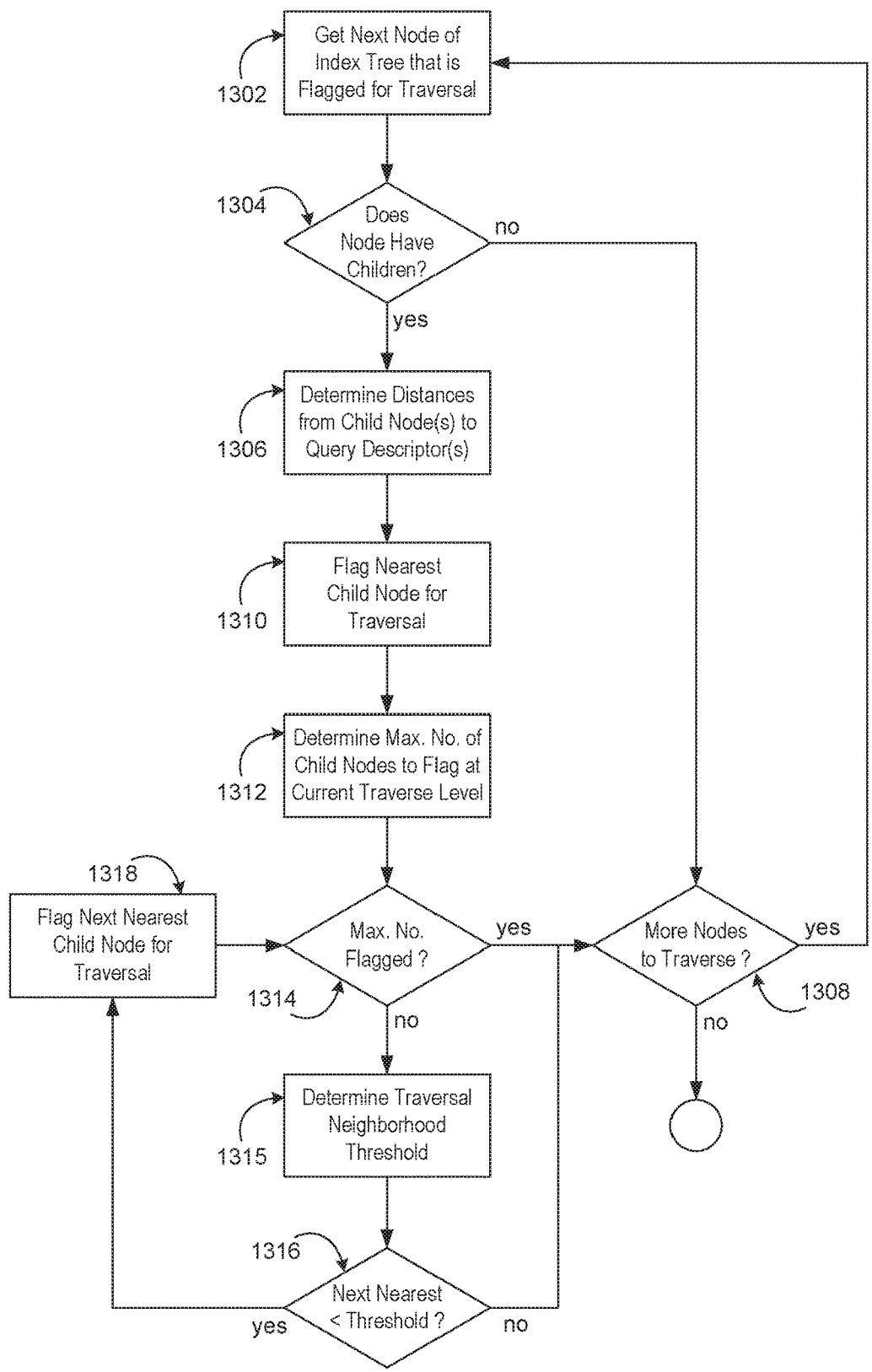
FIG. 13 is a flowchart depicting example steps for index tree traversal in accordance with at least one embodiment.

In at least one embodiment, a size of the set of candidate descriptors identified at step 1210 is significant. Too small a size may result in matching errors including false positive matching errors. Too large a size may result in increased search request response latency, for example, due to slow index tree traversal times. FIG. 13 depicts an example process for traversing an index tree in accordance with at least one embodiment. The example process shown in FIG. 13 is best described with reference to an index tree 1400 shown in FIG. 14. The index tree 1400 shown in FIG. 14 has a plurality of nodes 1402, 1404, 1406, 1408, 1410, 1412, 1414, 1416, 1418, 1420, 1422, 1424, 1426, 1428, 1430, 1432 arranged in a plurality of levels 1434, 1436, 1438. The lowest level nodes 1438 reference a set of content descriptors 1440 including content descriptor 1442 that is nearest of the set of content descriptors 1440 to a given query descriptor 1444. As with the index tree, node sizes in the index tree 1400 may be understood as corresponding to descriptor space region sizes, and the descriptor space region corresponding to a parent node (e.g., node 1404) may be understood as containing the descriptor space regions corresponding to its child nodes (e.g., nodes 1410, 1412, 1414, 1416).

At step 1302, a next (e.g., a first) node of the index tree 1400 that is flagged for traversal may be selected. For example, the system may initially select the root node 1402 of the index tree 1400. In at least one embodiment, the root node 1402 of the index tree 1400 is initially flagged for traversal. A procedure incorporating one or more steps depicted in FIG. 13 may utilize any suitable node flagging technique. Examples of suitable node flagging techniques include identifying and/or selecting nodes for traversal, as well as adding at least references to nodes to one or more node traversal lists and/or sets. In at least one embodiment, selecting a flagged node for traversal includes unflagging the node. At step 1304, it may be determined whether the node selected at step 1302 has one or more child nodes. If so, the procedure may progress to step 1306. Otherwise, the procedure may progress to step 1308. For example, the system may determine that the root node 1402 has child nodes 1404, 1406 and 1408.

At step 1306, one or more distances between each of a set of query descriptors and each of the child nodes of the node selected at step 1302 may be determined. For example, the set of query descriptors may have been determined above, and the distance(s) may be determined with respect to the metric of the descriptor space by the system. The system may determine distances between the query descriptor 1444 and index descriptors of each of the nodes 1404, 1406 and 1408. At step 1310, a nearest one of the one or more child nodes may be flagged for traversal. For example, the system may flag node 1406 for traversal.

At step 1312, a maximum number of child nodes to flag for traversal (a "fan-out" threshold) may be determined. In at least one embodiment, the fan-out threshold is based at least in part on the level of the index tree 1400 containing the node selected at step 1302 and/or its child nodes. For example, the fan-out threshold may be a linear function of the level. Alternatively, the fan-out threshold may be a non-linear function of the level. Each of the levels of the index tree 1400 may be classified into one of a plurality of level classes. Each of the level classes may be associated with a fan-out threshold (e.g., of 2-10). For example, levels of the index tree 1400 may be classified into one or more upper level classes, one or more middle level classes and/or one or more lower level classes, and the upper level class(es) may each have an upper fan-out threshold (e.g., 2), the middle level class(es) may each have a middle fan-out threshold (e.g., 3), and the lower level class(es) may each have a lower fan-out threshold (e.g., 2). In at least one embodiment, a greatest matching error reduction may be achieved by setting the middle fan-out threshold to be greater than the upper fan-out threshold and/or the lower fan-out threshold.

The system may identify that the root node 1402 resides at the zeroth level of the index tree 1400 and, at step 1312, determine that the fan-out threshold is 2. At step 1314, it may be determined whether the maximum number of child nodes has been flagged for traversal. If so, the procedure may progress to step 1308. Otherwise, the procedure may progress to step 1315.

At step 1315, a traversal neighborhood threshold may be determined. For example, the system may determine the traversal neighborhood threshold based on the level of the index tree 1400 containing the node selected at step 1302, a size of a region of the descriptor space to which the node selected at step 1302 corresponds, a number of child nodes of the node selected at step 1302, and/or a number of content descriptors referenced by the node selected at step 1302 (directly or indirectly). In at least one embodiment, the traversal neighborhood threshold is based at least in part on a distance between the query descriptor and a nearest child node (the "reference distance"). Relative distances and/or thresholds may be determined (e.g., normalized) with respect to the reference distance. The traversal neighborhood threshold may be a linear function of the reference distance. Alternatively, the traversal neighborhood threshold may be a non-linear function of the reference distance.

At step 1316, it may be determined whether a next nearest child node is at a distance and/or a relative distance from the set of query descriptors that is less than the traversal neighborhood threshold. If so, the procedure may progress to step 1318. Otherwise, the procedure may progress to step 1308. For example, system may determine that the next nearest child node 1404 is at a distance and/or a relative distance from the query descriptor 1444 that is less than the traversal neighborhood threshold (e.g., less than 120%-180% of the reference distance).

At step 1318, the next nearest child node identified at step 1316 may be flagged for traversal. For example, the system may flag node 1404 of the index tree 1400 for traversal. The procedure may then progress to step 1314 to determine if the fan-out threshold has been reached. Because the fan-out threshold for the zeroth level 1434 was determined to be 2 at step 1312, and nodes 1406 and 1404 have been flagged for traversal, the procedure progresses to step 1308.

At step 1308, it may be determined whether there are more nodes flagged for traversal (e.g., previously flagged for traversal at steps 1310 and 1318). If so, the procedure may return to step 1302 to select the next node for traversal. Otherwise, the procedure may progress to one or more steps not shown in FIG. 13 such as step 1210 of FIG. 12. The system may determine that nodes 1406 and 1404 are flagged for traversal and, as yet, untraversed. Accordingly, the procedure may return to step 1302 to select the next node 1406 for traversal.

The system may determine (e.g., at step 1304) that node 1406 has child nodes 1418, 1420, 1422, 1424, that node 1418 is nearest the query descriptor 1444 (e.g., at step 1310), and that the fan-out threshold for the first level 1436 is 3. The system may further determine (e.g., at steps 1316) that nodes 1422 and 1424 are less than the traversal neighborhood threshold and flag them for traversal at step 1318. Similarly, the system may determine that node 1404 has child nodes 1410, 1412, 1414, 1416, that node 1416 is nearest the query descriptor 1444, that nodes 1414 and 1412 are within the traversal neighborhood threshold, and, accordingly, flag nodes 1416, 1414 and 1412 for traversal.

Figure 14:
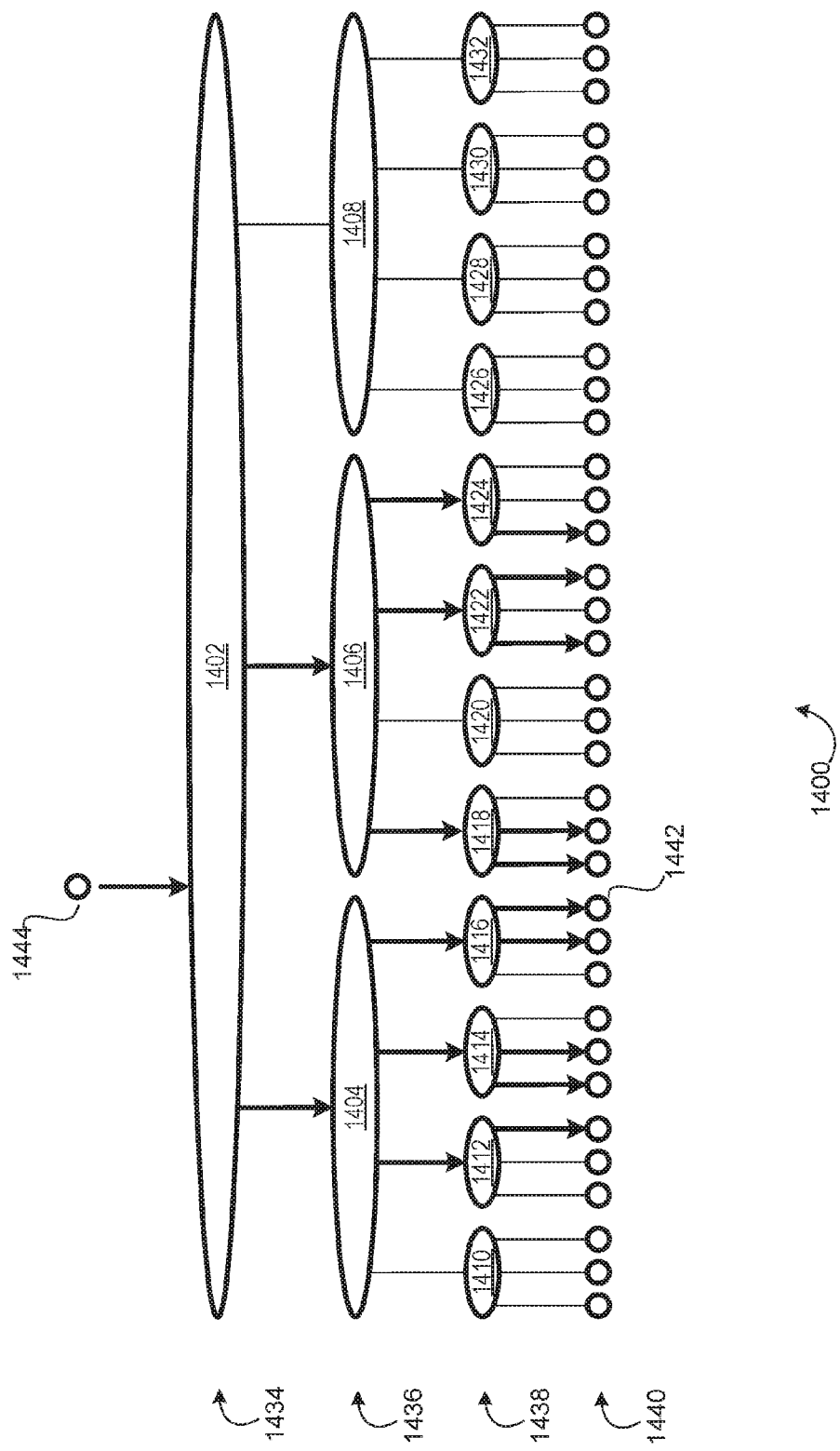
FIG. 14 is schematic diagram depicting aspects of an example index tree traversal in accordance with at least one embodiment.

Using the example index tree 1400 shown in FIG. 14, the process may identify a subset of the content descriptors 1440 once a subset of the lowest level nodes 1438 is determined. It may be that the content descriptors are not considered traversable nodes of the index tree 1400. For example, a result of the procedure may be to identify the nodes 1412, 1414, 1416, 1418, 1422 and 1424 as the set of lowest level nodes nearest the query descriptor 1444, and the procedure may progress to step 410 of FIG. 4 to identify candidate content descriptors (e.g., those content descriptors referenced by the nodes 1412, 1414, 1416, 1418, 1422 and 1424). Alternatively, as in the example referencing FIG. 14, content descriptors may be considered traversable nodes of the index tree 1400. Accordingly, identification of the candidate content descriptors may be integral to traversal.

As shown in FIG. 14, node 1418 references three content descriptors (each unlabeled). As described above with reference to FIG. 13 and FIG. 14, the fan-out threshold for the second level 1438 may be 2. In this case, the system may determine that two of the child nodes of node 1418 are within the traversal neighborhood threshold. FIG. 14 illustrates that the two child nodes of node 1418 are within the traversal neighborhood threshold with bold traversal arrows. FIG. 14 further illustrates that two child nodes of each node 1414, 1416 and 1422 are within the traversal neighborhood threshold for the node. With respect to nodes 1412 and 1424, FIG. 14 illustrates that, although the fan-out threshold for the second level 1428 is 2, only one child node of each of nodes 1412 and 1424 is determined to be within the traversal neighborhood threshold.

FIG. 14 illustrates that content descriptor 1442 is the "nearest neighbor" to query descriptor 1444. Content descriptor 1442 is not referenced by node 1406 although node 1406 was initially identified as the node nearest to the query descriptor 1444. In particular, the content descriptor 1442 is not referenced by one of the child nodes 1418, 1420, 1422, 1424 of node 1406.

Figure 15:
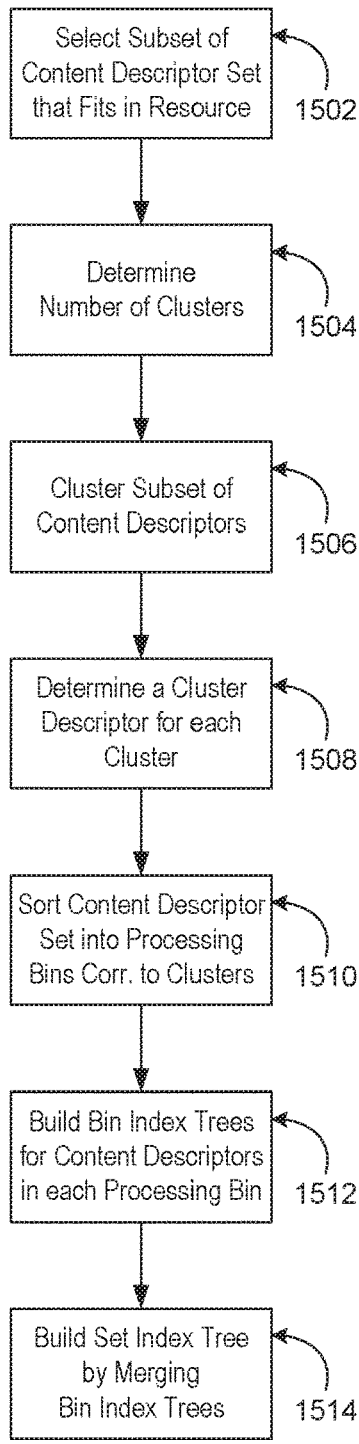
FIG. 15 is a flowchart depicting example steps for an approximate index tree build in accordance with at least one embodiment.

As described above, when the set of content descriptors is large, performance of step 1202 of FIG. 12 may involve significant use of computational resources and/or time. Furthermore, when the set of content descriptors is too large to fit in an available amount of relatively high quality storage, index tree build times may become inconvenient and even prohibitive. The description turns now to index tree build procedures in accordance with at least one embodiment when the set of content descriptors is too large to fit in the available amount of relatively high quality storage. FIG. 15 depicts example steps for building the index tree in accordance with at least one embodiment.

At step 1502, a subset of the set of content descriptors may be selected that fits in the available amount of relatively high quality storage. For example, the system may select the subset at least in part by sampling the set of content descriptors. Any suitable sampling technique may be utilized by the system as part of selecting the subset. Examples of suitable sampling techniques include deterministic techniques such as uniform sampling, as well as random and pseudorandom sampling.

Suppose the index tree 1100 is the tree that would be conventionally built if the set of content descriptors fit in the available amount of relatively high quality storage. The subset of the set of content descriptors selected at step 1502 may be utilized to approximate regions of the descriptor space corresponding to nodes 1104, 1106, 1108, 1110, 1112, 1114, 1116 of the first level 1122 of the index tree 1100. At step 1504, a number of clusters into which to cluster the subset of the set of content descriptors may be determined. For example, the system may determine the number of clusters based at least in part on a size of the set of content descriptors and/or the available amount of relatively high quality storage. The system may set the number of clusters to be greater than, or equal to, the size of the set of content descriptors divided by the available amount of relatively high quality storage.

At step 1506, the subset of the set of content descriptors may be clustered into the number of clusters determined at step 1504. For example, the system may cluster the subset utilizing any suitable clustering technique such as k-means clustering. At step 1508, a cluster descriptor may be determined for each of the clusters created at step 1506. For example, the system may determine the cluster descriptors as described above for index descriptors of lowest level nodes 1118, 1120.

At step 1510, the set of content descriptors may be sorted into processing bins that correspond to the clusters created at step 1506. For example, a processing bin may be created (e.g., in the data store) for each cluster created at step 1506. The system may place each of the set of content descriptors into the processing bin corresponding to the cluster having the cluster descriptor that is nearest the content descriptor with respect to the metric of the descriptor space. The system may furthermore limit each processing bin to a number of content descriptors that may fit in the available amount of relatively high quality storage. Step 1510 may be considered to be part of a first build pass of the set of content descriptors.

At step 1512, a bin index tree may be built for the content descriptors in each processing bin. For example, the system may build an index tree corresponding to the index tree 300 (FIG. 3) for each of the processing bins created at step 1510 utilizing a conventional hierarchical k-means clustering technique. Step 1512 may be considered to be part of a second build pass of the set of content descriptors. At step 1514, the index tree for the set of content descriptors may be built based at least in part on the bin index trees built at step 1512. The system may merge the bin index trees built at step 1512 to build the index tree. For example, the system may create the index tree at least in part by adding the root nodes of the bin index trees built at step 1512 as child nodes to the root node of the index tree.

Figure 16:
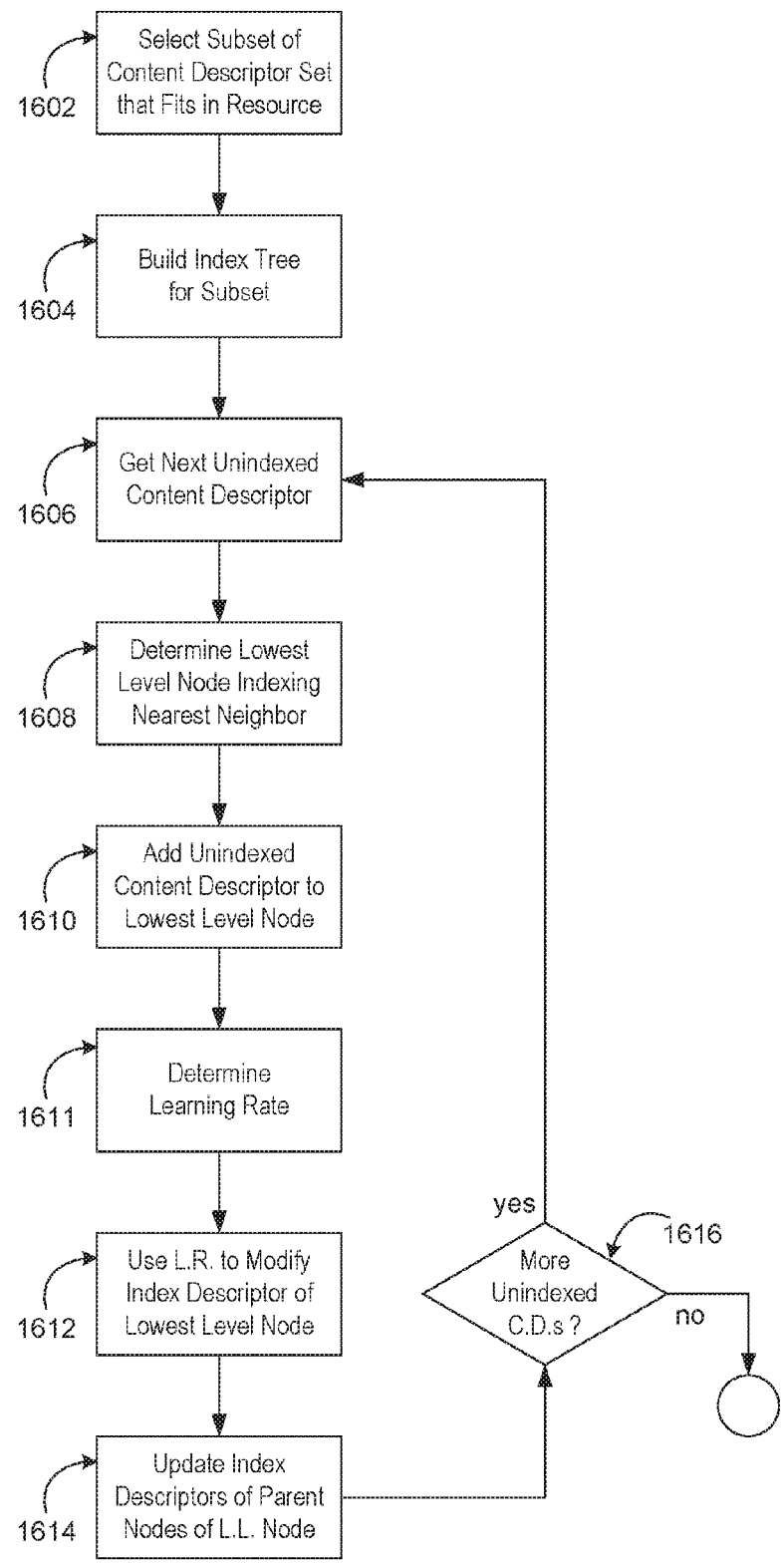
FIG. 16 is a flowchart depicting example steps for a refining index tree build in accordance with at least one embodiment.

Once the index tree has been established, it may be desirable to have a capability to update the index tree responsive to changes to the set of content descriptors without performing a full index tree build such as the one described above with reference to FIG. 15. FIG. 16 depicts example steps for a refining index tree build in accordance with at least one embodiment.

Steps 1602 and 1604 of FIG. 16 may be included in an index tree building procedure in the case that the index tree has not yet been established. At step 1602, a subset of the set of content descriptors may be selected that fits in the available amount of relatively high quality storage. For example, the subset may be selected as described above for step 1502 of FIG. 15. At step 1604, the index tree may be established for the subset of the set of content descriptors, for example, utilizing a conventional hierarchical k-means clustering technique.

At step 1606, a next (e.g., a first) unindexed content descriptor in the set of content descriptors may be selected. For example, the system may select the next of the set of content descriptors not yet indexed by the index tree. At step 1608, a lowest level node indexing a content descriptor that is nearest the unindexed content descriptor (the "new parent node") may be determined. For example, the refining tree build 216 may traverse the tree as described above to determine the indexed content descriptor nearest the unindexed content descriptor (where the unindexed content descriptor plays the role of a query descriptor) and/or its indexing lowest level node. At step 1610, the unindexed content descriptor may be added as a child of the new parent node.

At step 1611, a learning rate may be determined. The learning rate may correspond to an amount by which the index descriptor for the new parent node is adjusted with respect to the content descriptor newly added to the new parent node at step 1610. For example, considering the index descriptor and the unindexed content descriptor as points in the descriptor space, coordinates of the index descriptor may be adjusted so as to reduce the distance between the index descriptor and the unindexed content descriptor by the learning rate (e.g., by 20%-50% of the current distance). Examples of learning rates in accordance with at least one embodiment are described in more detail below. At step 1612, the index descriptor for the new parent node may be updated. For example, the system may adjust the index descriptor of the new parent node in accordance with the learning rate determined at step 1611.

At step 1614, the index descriptors of each of the parent nodes of the new parent node may be updated, for example, as described for the new parent node with reference to step 1612. With reference to FIG. 11, suppose it is determined at step 1608 that the unindexed content descriptor should be added to node 1118. The index descriptor 1130 of the node 1118 would be updated at step 2412, and the index descriptor 1134 of the node 1114 would be updated at step 2414. If node 1112 were not the root node of the index tree 1100, or if node 1112 had an index descriptor, the index descriptor of node 1112 would also be updated at step 2414.

Alternatively, or in addition, a plurality of learning rates may be determined at step 1611. The new parent node may be classified as a "winning" node. Another subset of lowest level nodes may be classified as "losing" nodes. For example, the losing subset of lowest level nodes may include lowest level nodes considered as candidates for the winning node. Further lowest level node classes may be identified. For example, lowest level nodes not considered as candidates to be the winning node may be classified as noncandidate nodes. Learning rates may be determined for each class of lowest level node. Alternatively, or in addition, learning rates may be determined for each lowest level node, for example, based on node classification. The learning rate of the winning node may correspond to movement of the node's index descriptor towards the newly added content descriptor. The learning rate of the losing nodes may correspond to movement of the node's index descriptor away from the newly added content descriptor. Each node for which a learning rate was determined may have its index descriptor modified at step 1612. The parents of each node with a modified index descriptor may be updated at step 1614.

At step 1616, it may be determined whether there are any more unindexed content descriptors in the set of content descriptors. If so, the procedure may return to step 1606. Otherwise, the procedure may progress to steps not shown in FIG. 16 such as step 404 of FIG. 4. The test at step 1616 and the return to step 1606 to process the next unindexed content descriptor may be repeated until the index tree indexes each of the content descriptors. The steps depicted in FIG. 16 may be considered to be part of a single build pass of the set of content descriptors.

The learning rate utilized at step 1612 may be a constant (e.g., a 40% reduction). Alternatively, the learning rate may vary based at least in part on one or more suitable learning rate parameters. Examples of suitable learning rate parameters include a size of a node and/or cluster for which the index descriptor is being updated, proximity and/or relatively proximity between the index descriptor and the newly added content descriptors, the number of content descriptors indexed by the index tree, a number of content descriptors remaining unindexed, and suitable combinations thereof including ratios and linear combinations. The size of the node and/or cluster in this context may be the number of child nodes referenced by the node and/or the number of descriptors in the cluster. The learning rate may be a linear function of the learning rate parameters. Alternatively, the learning rate may be a non-linear function of the learning rate parameters.

Figure 17:
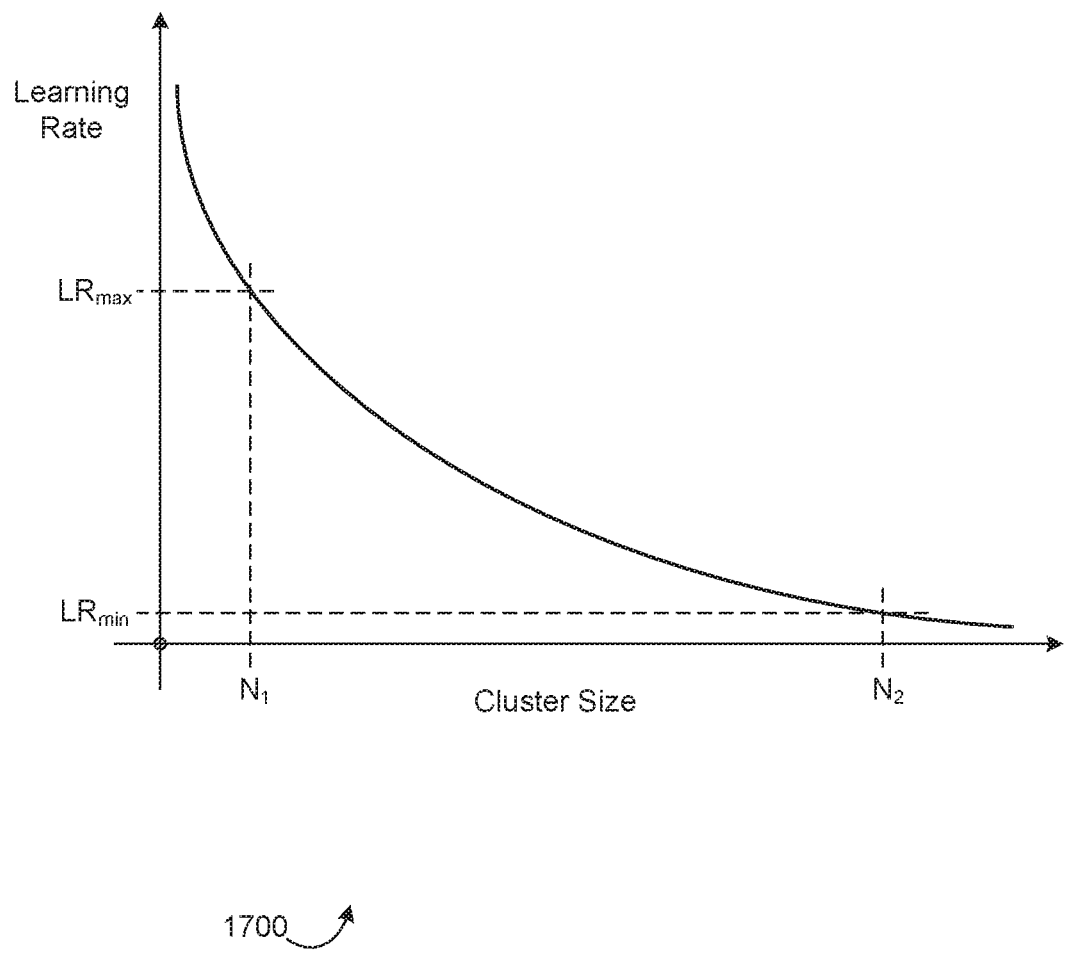
FIG. 17 is a graph of learning rate in accordance with at least one embodiment.

The graph 1700 in FIG. 17 shows learning rate decreasing non-linearly from a maximum learning rate ($LR_{max}$) to a minimum learning rate ($LR_{min}$) as the size of the node and/or cluster increases. The maximum learning rate may be utilized for node and/or cluster sizes less than, or equal to, a first cluster size threshold ($N_1$). The minimum learning rate may be utilized for node and/or cluster sizes less than, or equal to, a second cluster size threshold ($N_2$). As node and/or cluster size increases from the first cluster size threshold to the second cluster size threshold, the learning rate may decrease polynomially or exponentially from the maximum learning rate to the minimum learning rate.

The various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business map servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
   at least one processor; and
   memory storing instructions that, when executed by the at least one processor, cause the system to:
   analyze image data to recognize a set of words represented in the image data, the set of words associated with an area of the image data that includes brand identifying information;
   determine that a word of the set of words is associated with a stored term stored in a database provided by a resource provider, the stored term associated with an item;
   associate the stored term with the brand identifying information based at least in part on a bounding box, associated with the brand identifying information, determined using a heatmap of the image data, the heatmap including highest intensity values for portions of the image data with a highest number of overlapping bounding boxes corresponding to the set of words;
   receive a search query that includes at least a portion of the brand identifying information; and
   generate a result set that includes the item.

2. The system of claim 1, wherein the instructions when executed by the at least one processor to analyze the image data further enables the system to:
   determine a first set of visual words, a first visual word of the first set of visual words representative of a first grouping of pixels in the image data; and
   determine a second set of visual words, a second visual word of the second set of visual words representative of a second grouping of pixels in different image data, the brand identifying information being absent in the different image data.

3. The system of claim 2, wherein the instructions when executed by the at least one processor further enables the system to:
   determine a set of visual words from the first set of visual words and the second set of visual words that includes visual words satisfying a threshold likelihood that the stored term is associated with the visual words.

4. The system of claim 3, wherein the instructions when executed by the at least one processor to determine the set of visual words further enables the system to:

determine a respective first count for visual words from the first set of visual words that co-occurs in the image data;
determine a respective second count for visual words from the second set of visual words that co-occurs in the different image data;
determine, for the set of visual words and based at least in part on the respective first count for the visual words, a respective first probability that the stored term is associated with the visual word;
determine, for each visual word and based at least in part on the respective second count for the visual word, a respective second probability that the stored term is not associated with the visual word; and
determine a respective likelihood that the stored term is associated with the visual word based at least in part on the respective first probability and the respective second probability.

5. The system of claim 4, wherein co-occurrence in the image data is determined based at least in part on a pairwise comparison between images in a first set of images that includes the image data.

6. The system of claim 4, wherein co-occurrence in the different image data is determined based on a pairwise comparison between images in a first set of images that includes the image data and images in a second set of images.

7. The system of claim 4, wherein the instructions when executed by the at least one processor to determine the respective first probability further enables the system to:
   divide the respective first count for the visual words from the first set of visual words by a number of pairwise comparisons between images in a first set of images that includes the image data.

8. The system of claim 4, wherein the instructions when executed by the at least one processor to determine the respective second probability further enables the system to:
   divide the respective second count for the visual words from the second set of visual words by a number of pairwise comparisons between images in s first set of images that includes the image data and images in a second set of images.

9. A method, comprising:
   analyzing image data to recognize a set of words represented in the image data, the set of words associated with an area of the image data that includes brand identifying information;
   determining that a word of the set of words is associated with a stored term stored in a database provided by a resource provider, the stored term associated with an item;
   associating the stored term with the brand identifying information based at least in part on a bounding box, associated with the brand identifying information, determined using a heatmap of the image data, the heatmap including highest intensity values for portions of the image data with a highest number of overlapping bounding boxes corresponding to the set of words;
   receiving a search query that includes at least a portion of the brand identifying information; and
   generating a result set that includes the item.

10. The method of claim 9, further comprising:
    determining a first set of visual words, a first visual word of the first set of visual words representative of a first grouping of pixels in the image data;
    determining a second set of visual words, a second visual word of the second set of visual words representative of a second grouping of pixels in different image data, the brand identifying information being absent in the different image data; and determining a set of visual words from the first set of visual words and the second set of visual words that includes visual words satisfying a threshold likelihood that the stored term is associated with the visual words.

11. The method of claim 10, further comprising:

determining a respective first count for visual words from the first set of visual words that co-occurs in the image data;

determining a respective second count for visual words from the second set of visual words that co-occurs in the different image data;

determining, for the set of visual words and based at least in part on the respective first count for the visual words, a respective first probability that the stored term is associated with the visual word;

determining, for each visual word and based at least in part on the respective second count for the visual word, a respective second probability that the stored term is not associated with the visual word; and determining a respective likelihood that the stored term is associated with the visual word based at least in part on the respective first probability and the respective second probability.

12. The method of claim 11, wherein determining the respective likelihood that the stored term is associated with the visual word further comprises:

determining a sum of the respective first probability and the respective second probability; and determining a likelihood that the stored term is associated with the visual word based at least in part on dividing the respective first probability by the sum.

13. The method of claim 9, wherein associating the stored term with the brand identifying information further comprises:

generating the heatmap of the image data;

identifying a first region in the image data that includes a pixel having a highest pixel value;

determining a second region in the image data that is connected to the first region; and determining a bounding box that includes the first region and the second region.

14. The method of claim 13, wherein generating the heatmap further comprises:

determining a respective pixel value for each pixel in the image data based at least in part on a number of visual words in a set of visual words that correspond to a region in the image data that includes the pixel.

15. The method of claim 13, wherein determining the second region further comprises:

determining a region in the image data that is adjacent to the first region or overlaps with the first region.

16. A non-transitory computer readable storage medium storing one or more sequences of instructions executable by one or more processors to perform a set of operations comprising:

analyzing image data to recognize a set of words represented in the image data, the set of words associated with an area of the image data that includes brand identifying information;

determining that a word of the set of words is associated with a stored term stored in a database provided by a resource provider, the stored term associated with an item;

associating the stored term with the brand identifying information based at least in part on a bounding box, associated with the brand identifying information, determined using a heatmap of the image data, the heatmap including highest intensity values for portions of the image data with a highest number of overlapping bounding boxes corresponding to the set of words;

receiving a search query that includes at least a portion of the brand identifying information; and generating a result set that includes the item.

17. The non-transitory computer readable storage medium of claim 16, further comprising instructions executed by the one or more processors to perform the set of operations of:

determining a first set of visual words, a first visual word of the first set of visual words representative of a first grouping of pixels in the image data;

determining a second set of visual words, a second visual word of the second set of visual words representative of a second grouping of pixels in different image data, the brand identifying information being absent in the different image data; and determining a set of visual words from the first set of visual words and the second set of visual words that includes visual words satisfying a threshold likelihood that the stored term is associated with the visual words.

18. The non-transitory computer readable storage medium of claim 17, further comprising instructions executed by the one or more processors to perform the set of operations of:

determining a respective first count for visual words from the first set of visual words that co-occurs in the image data;

determining a respective second count for visual words from the second set of visual words that co-occurs in the different image data;

determining, for the set of visual words and based at least in part on the respective first count for the visual words, a respective first probability that the stored term is associated with the visual word;

determining, for each visual word and based at least in part on the respective second count for the visual word, a respective second probability that the stored term is not associated with the visual word; and determining a respective likelihood that the stored term is associated with the visual word based at least in part on the respective first probability and the respective second probability.

19. The non-transitory computer readable storage medium of claim 18, further comprising instructions executed by the one or more processors to perform the set of operations of:

determining a sum of the respective first probability and the respective second probability; and determining a likelihood that the stored term is associated with the visual word based at least in part on dividing the respective first probability by the sum.

20. The non-transitory computer readable storage medium of claim 16, further comprising instructions executed by the one or more processors to perform the set of operations of:

generating the heatmap of the image data;

identifying a first region in the image data that includes a pixel having a highest pixel value;

determining a second region in the image data that is connected to the first region; and determining a bounding box that includes the first region and the second region.

* * * * *